(12) United States Patent
Sugawara et al.

(10) Patent No.: US 10,378,490 B2
(45) Date of Patent: Aug. 13, 2019

(54) VALVE DEVICE AND METHOD FOR MANUFACTURING THE SAME

(71) Applicant: DENSO CORPORATION, Kariya, Aichi-pref. (JP)

(72) Inventors: Takehiro Sugawara, Kariya (JP); Yuichiro Moritani, Kariya (JP)

(73) Assignee: DENSO CORPORATION, Kariya (JP)

( * ) Notice: Subject to any disclaimer, the term of this patent is extended or adjusted under 35 U.S.C. 154(b) by 98 days.

(21) Appl. No.: 15/800,355

(22) Filed: Nov. 1, 2017

(65) Prior Publication Data
US 2018/0171943 A1 Jun. 21, 2018

(30) Foreign Application Priority Data

Dec. 15, 2016 (JP) .................................. 2016-243250

(51) Int. Cl.
| | |
|---|---|
| *F16K 1/226* | (2006.01) |
| *F02M 26/70* | (2016.01) |
| *F02M 26/21* | (2016.01) |
| *F02M 26/54* | (2016.01) |
| *F02M 26/72* | (2016.01) |

(52) U.S. Cl.
CPC ............ *F02M 26/70* (2016.02); *F02M 26/21* (2016.02); *F02M 26/54* (2016.02); *F02M 26/72* (2016.02); *F16K 1/226* (2013.01); *F16K 1/2261* (2013.01); *F16K 1/2263* (2013.01)

(58) Field of Classification Search
CPC ....... F02M 26/70; F16K 1/226; F16K 1/2261; F16K 1/2263; F16K 1/2265
USPC .............. 123/361, 399, 337, 568.18, 568.23; 251/306
See application file for complete search history.

(56) References Cited

U.S. PATENT DOCUMENTS

| | | | | |
|---|---|---|---|---|
| 4,593,916 | A * | 6/1986 | Laulhe | F16K 1/226 251/306 |
| 4,638,976 | A * | 1/1987 | Souplet | F16K 1/2285 251/173 |
| 6,494,466 | B1 * | 12/2002 | Hartman | F16J 15/025 251/305 |
| 2009/0050106 | A1 * | 2/2009 | Bessho | F02D 9/1005 123/337 |
| 2018/0100586 | A1 * | 4/2018 | Ishigaki | F16K 1/221 |

FOREIGN PATENT DOCUMENTS

| | | |
|---|---|---|
| JP | 2013-044415 | 3/2013 |
| WO | WO 2017/150026 | 9/2017 |

* cited by examiner

*Primary Examiner* — Erick R Solis
(74) *Attorney, Agent, or Firm* — Nixon & Vanderhye P.C.

(57) ABSTRACT

Shaft is rotationally driven, and a valve body rotates together with the shafts and has a cylindrical surface on an outer peripheral surface. A housing has a valve chamber in which the valve body is rotatably accommodated, and the valve chamber has an opening opened or closed by the valve body. The outer peripheral surface is provided to be in a non-contact with the housing. The valve body has a valve seal surface for closing the opening by abutting on a predetermined part set in the housing when the opening is fully closed, and the valve seal surface is directed in the circumferential direction. The valve body has a core metal made of a metal, and the shafts are provided on both ends of the core metal, and a valve seal surface is made of a resin.

11 Claims, 22 Drawing Sheets

VALVE DEVICE AND METHOD FOR MANUFACTURING THE SAME

CROSS REFERENCE TO RELATED APPLICATION

The present application is based on Japanese Patent Application No. 2016-243250 filed on Dec. 15, 2016, disclosure of which is incorporated herein by reference.

TECHNICAL FIELD

The present disclosure relates to a valve device including a valve body having at least a part of a cylindrical surface or a spherical surface on an outer peripheral surface which protruding outwardly in a radial direction for increasing or decreasing an opening degree of a passage of the fluid by rotationally driving the valve body, and a method for manufacturing the valve device (the valve device having at least a part of a cylindrical surface or a spherical surface on an outer peripheral surface for increasing or decreasing an opening degree of the passage by rotationally driving the valve body is referred to as a rotary type valve device).

BACKGROUND

A conventional rotary type valve device has a shaft, and a valve body, a housing, and a seal portion.

First of all, the shaft is rotated and driven by output of a motor or the like, and the valve body rotates integrally with the shaft and is provided with at least a part of a cylindrical surface on an outer peripheral surface. The housing has a valve chamber, in which the valve body is rotatably accommodated, and the valve chamber has a valve opening which is opened or closed by the valve body.

The seal portion is configured to maintain a closure of the passage when the valve opening is fully closed, and a valve body side seal on a side of the valve body is in contact with a housing side seal on a side of the housing such that the closure of the passage is maintained (see, Japanese Patent Publication No. 2013-44415 referred to as a patent document 1).

However, in the valve device of the patent document 1, further improvement is necessary regarding a holding of the shaft with high accuracy and a securing of a seal surface accuracy at a low cost.

SUMMARY

It may be preferable to provide the valve device for improving the holding of the shaft with high accuracy and the securing of the seal surface accuracy at a low cost.

In one exemplary aspect, a valve device has a shaft, a valve body, and a housing as described below.

The shaft is rotationally driven, and the valve body rotates together with the shaft and has the cylindrical surface on an outer peripheral surface. The housing has a valve chamber in which the valve body is rotatably accommodated, and the valve chamber has an opening opened or closed by the valve body.

The outer peripheral surface of the valve body is provided to be in a non-contact with the housing. The valve body has a valve seal surface for closing the opening by abutting on a predetermined part set in the housing when the opening is fully closed, and the valve seal surface is directed in the circumferential direction. The valve body has a core metal made of a metal, and the shafts are provided on both ends of the core metal, and the valve seal surface is made of a resin.

Since the core metal for holding the shafts is made of a metal, a position of the shafts is accurately maintained by suppressing a deformation of the core metal with respect to a temperature change. Since the valve seal surface is made of a resin, a cutting process is unnecessary to secure the surface accuracy of the valve seal surface, and the surface accuracy can be secured by a mold. Accordingly, in the rotary type valve device, the holding of the shaft with high accuracy and the securing of the seal surface accuracy at a low cost can be obtained.

DETAILED DESCRIPTION

Embodiments will be described below. The embodiments disclose specific examples.

First Embodiment

A valve device in the first embodiment is explained based on FIGS. 1 to 19.

Figure 1:
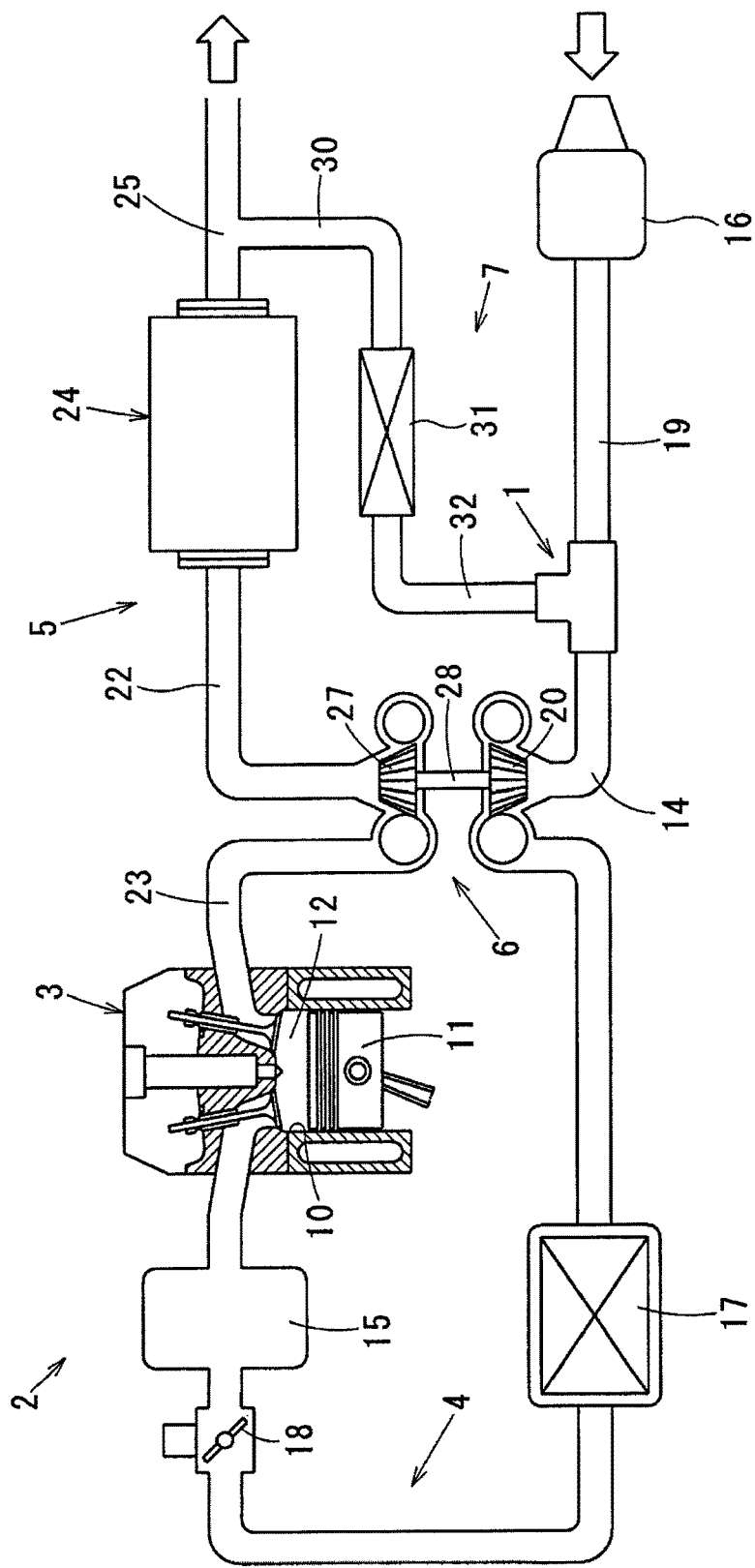
FIG. 1 is a diagram illustrating an overall structure of an internal combustion engine including a valve device in a first embodiment.

An internal combustion engine 2 including the valve device 1 is described with reference to FIG. 1. The internal combustion engine 2 includes an engine body 3, an intake device 4, an exhaust device 4, a supercharger 6, and an exhaust gas recirculation device 7 (hereinafter, the exhaust gas recirculation is referred to as EGR).

The engine body 3 has a cylinder 10, and a piston 11 housed in the cylinder 10, and a combustion chamber 12 is formed between the cylinder 10 and the piston 11.

The intake device 4 supplies air from outside air to the engine body 3, and includes an intake pipe 14, an intake manifold 15, an air cleaner 16, an intercooler 17, a throttle 18, and the like (hereinafter, the air supplied to the engine body 3 is referred to as an intake air).

The intake pipe 14 is a pipe for introducing the intake air from the outside air to combustion chamber 12, and is formed as an intake passage 19. One end of the intake pipe 14 is opened to the outside air and the other end thereof is connected to the intake manifold 15. The intake manifold 15 connects between the other end of the intake pipe 14 and the engine body 3, and has a structure for branching into the same number of passages as the number of the cylinders 10. The air cleaner 16 removes foreign matters from the air taken from the outside air. The intercooler 17 cools the intake air which is compressed and is heated by the compressor 20 in the supercharger 6. The throttle 18 regulates an amount of the intake air into the engine body 3.

The exhaust device 5 discharges an exhaust gas discharged from the engine body 3 to the outside air, and includes an exhaust pipe 22, an exhaust manifold 23, and an exhaust gas purification unit 24.

The exhaust pipe 22 is a pipe for discharging the exhaust gas to the outside air from the engine body 3, and is formed as an exhaust passage 25. The exhaust manifold 23 connects between one end of an exhaust pipe 22 to the engine body 3, and has a structure for merging the same number of passages as the number of the cylinders 10. The exhaust gas purification unit 24 is incorporated in the exhaust pipe 22 in such a manner that the exhaust gas purification unit 24 decomposes a hydrocarbon (HC) in the exhaust gas and traps a fine particle-like substance (PM).

The supercharger 6 compresses the intake air in the intake pipe 14 by utilizing energy of exhaust gas, and supercharges the intake air to the combustion chamber 12. The supercharger 6 includes the compressor 20, a turbine 27, and a shaft 28. The compressor 20 is provided between the air cleaner 16 and the intercooler 17 in the intake passage 19, and compresses the intake air. The turbine 27 is provided between the exhaust manifold 23 and the exhaust gas purification unit 24 in the exhaust passage 25, and is rotationally driven by energy of the exhaust gas. The shaft 28 connects between the compressor 20 and the turbine 27 such that the compressor 20 and the turbine 27 are synchronously rotated by means of the shaft 28.

The EGR device 7 recirculates the exhaust gas after passing through the turbine 27 to the intake passage 19, and supplies air to the combustion chamber 12 together with air via the air cleaner 16. The EGR device 7 includes an EGR pipe 30 and an EGR cooler 31 together with the valve device 1.

The EGR pipe 30 connects between a position on a downstream side of the exhaust gas purification unit 24 in the exhaust pipe 22 and a position on an upstream side of the compressor 20 in the intake pipe 14. The EGR pipe 30 forms the EGR passage 32 for recirculating the exhaust gas passed after the turbine 27 to the air before compression by the compressor 20. The valve device 1 increases or decreases the flow amount of the exhaust gas which is recirculated to the intake passage 19 through the EGR passage 32.

Further, the EGR cooler 31 is provided on the upstream side of the valve device 1 in the exhaust pipe 32, and cools the exhaust gas passing in the EGR passage 32.

The valve device 1, the throttle 18, and the like are controlled by an electronic control unit (hereinafter, an electronic control unit is referred to as ECU) (not shown).

Subsequently, the valve device 1 is described with reference to FIGS. 2 to 19.

The valve device 1 adopts a rotary-type, in which an opening degree of the passage of the fluid is increased or decreased by rotationally driving the valve body 33 formed as a cylindrical shape, and specifically, the opening degree of the EGR passage 32 with respect to the intake passage 19 is increased or decreased.

The valve device 1 includes a shaft 36, a housing 34, a driving part 37, a detection part 38, and a stopper part 40 other than the valve body 33.

In the following description, a direction parallel to a rotation axis X1 (see, FIG. 10) of the valve body 33 is referred to as an axial direction, and a direction which turns around the periphery of the rotary shaft X1 is referred to as a circumferential direction, and a direction which approaches or leaves in a vertical direction with respect to the valve body 33 is referred to as a radial direction.

The shaft 36 is made of a stainless steel, and one end of the shaft 36 is rotationally driven by the driving part 37. In the following, one end of the shaft 36 is referred to as a shaft 36a and the other end of the shaft 36 is referred to as a shaft 36b.

Figure 4:
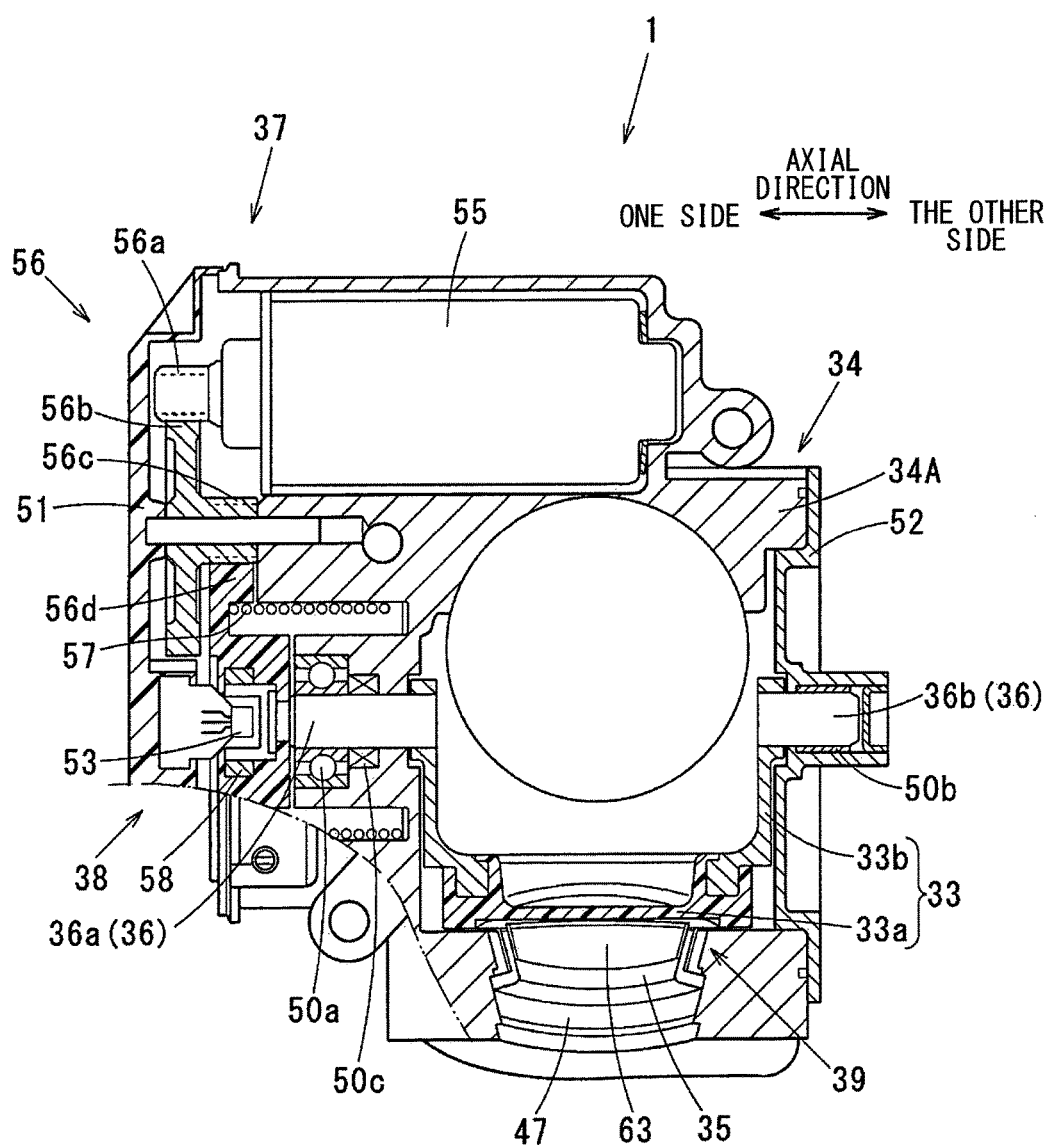
FIG. 4 is a diagram illustrating a cross sectional view taken along line IV-IV in FIG. 3.
Figure 8:
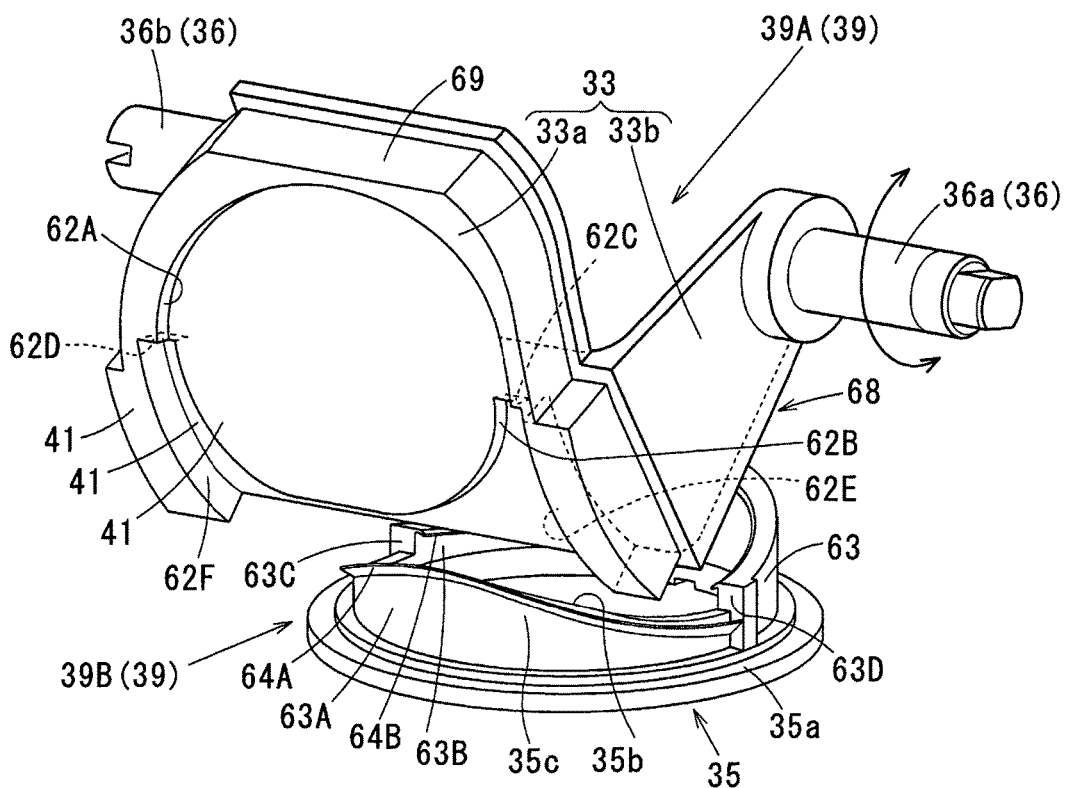
FIG. 8 is a diagram illustrating a perspective view of a valve body and the cylindrical body in the first embodiment.

The shaft 36a and the shaft 36b are integrated with the valve body 33, and rotate together with the valve body 33 (see, FIGS. 4 and 8).

The shaft 36a and the shaft 36b are respectively integrated with both sides of the valve body 33 so as to be coaxially with the rotation axis X1, and are respectively supported by the bearings 50a, 50b (see, FIG. 4). The driving part 37 is mechanically connected to one axial end of the shaft 36a and drives rotationally an integral body formed with the shaft 36 and the valve body 33.

A reduction gear 56 constituting a part of the driving part 37 and the detection part 38 are arranged on one side in the axial direction of the shaft 36a, a valve chamber 42 in which the valve body 33 is housed and rotatably supported is provided on the other side in the axial direction of the shaft 36a. An oil seal 50c is attached on the shaft 36a between the valve body 33 and the bearing 50a, and the oil seal 50c suppresses a leakage of the fluid from the valve chamber 42 to a space in which the reduction gear 56 and the detection part 38 are located.

Figure 5:
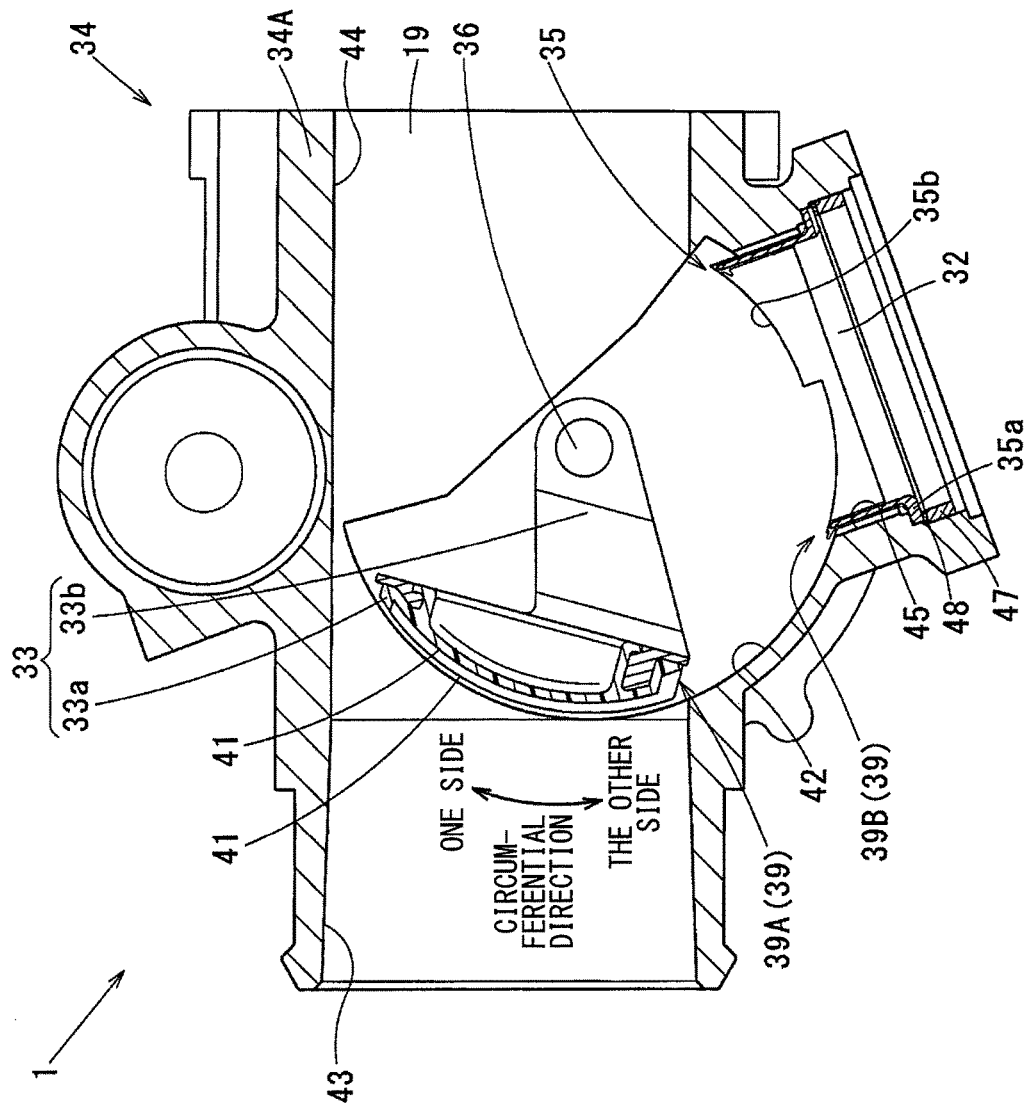
FIG. 5 is a diagram illustrating a cross sectional view of the valve device when EGR passage is opened in the first embodiment.
Figure 6:
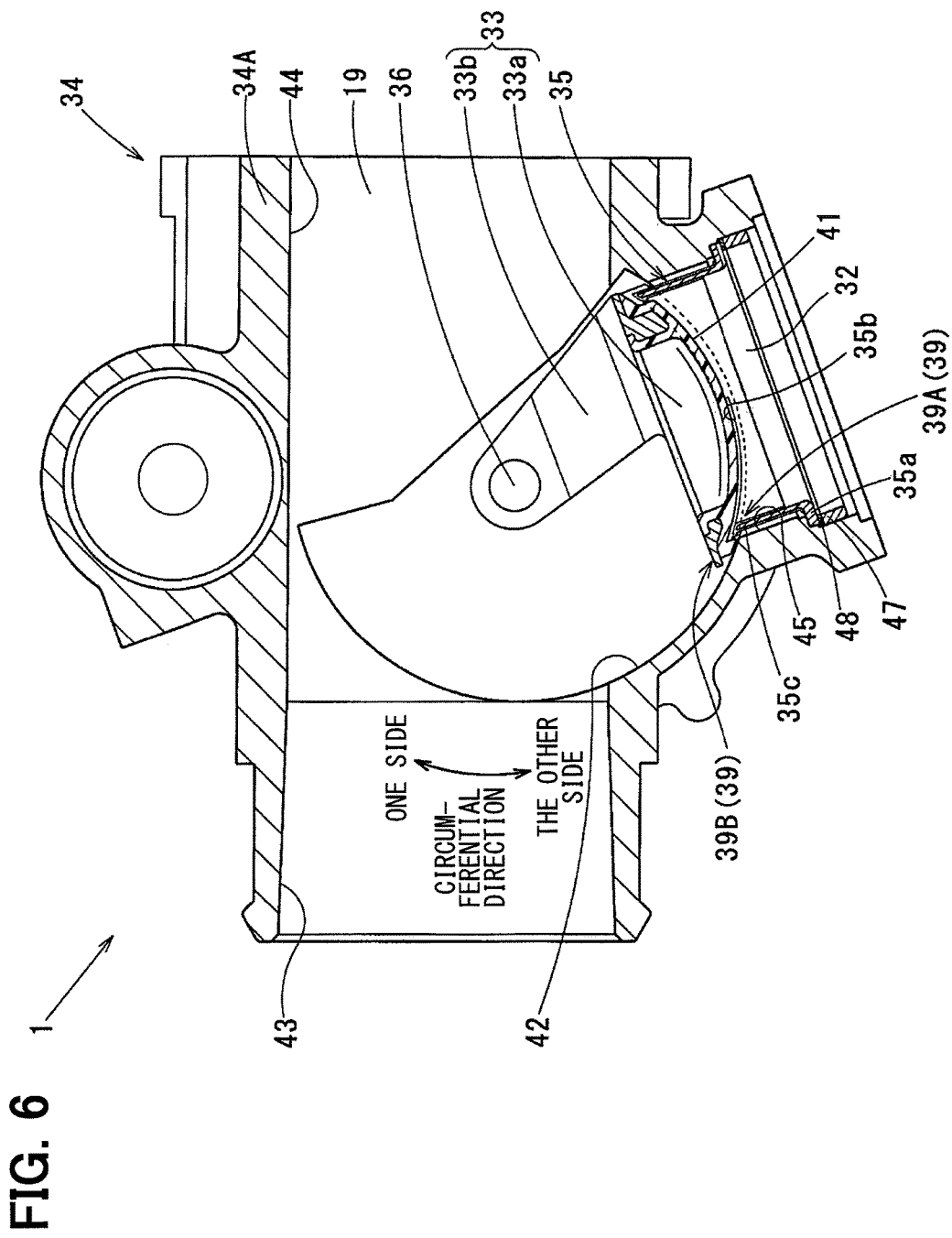
FIG. 6 is a diagram illustrating a cross sectional view of the valve device when EGR passage is closed in the first embodiment.

The valve body 33 rotates integrally with the shaft 36 and has a cylindrical surface on an outer peripheral surface 41 which protrudes outwardly in the radial direction (see, FIGS. 5, 6 and 8). Namely, the valve body 33 includes a valve portion 33a having the cylindrical outer peripheral surface 41 and two arms 33b respectively fastened to the shafts 36a, 36b. The valve body 33 increases or decreases the opening degree of the EGR passage 32 with respect to the intake passage 19 by rotating the valve body 33. The valve body 33 increases or decreases the opening degree of the EGR passage 32 and the opening degree of the intake passage 19, and introduces the exhaust gas to the intake passage 19 from the EGR passage 32 due to a negative pressure generated by decreasing the opening degree of the intake passage 19.

The housing 34 is mainly composed of a housing body 34A and a cylindrical body 35.

The housing body 34A is made of a metal material such as an aluminum etc. and forms a junction between the intake passage 19 and the EGR passage 32. The housing body 34A houses and rotatably supports the valve body 33.

More specifically, as shown in FIGS. 5 and 6, the housing body 34A includes a substantially cylindrical valve chamber 42 in which the valve body 33 is housed and rotatably supported, an upstream side passage 43 for guiding air to the valve chamber 42, a downstream side passage 44 for guiding air from the valve chamber 42 to the outside of the housing body 34A, and a housing space 45 for housing the cylindrical body 35 and an opening in the valve chamber 42. Here, the upstream side passage 43 and the downstream side passage 44 are coaxially provided, and form a part of the intake passage 19. An inner periphery of the cylindrical body 35 housed in the housing space 45 forms a part of the EGR passage 32.

The valve body 33 is housed in such a manner that an outer periphery of the valve portion 33a can move between an opening 35b formed in the inner periphery of the cylindrical body 35 and an opening of the upstream side passage 43 with respect to the valve chamber 42 by the rotation of the valve body 33.

The valve portion 33a fully closes the EGR passage 32 with respect to the valve chamber 42 and mostly opens the upstream side passage 43 with respect to the valve chamber 42, when the valve portion 33a is positioned on the side of the opening 35b of the cylindrical body 35 in the circumferential direction (see, FIG. 6). The valve portion 33a fully opens the EGR passage 32 with respect to the valve chamber 42 and mostly throttles the upstream side passage 43 with respect to the valve chamber 42, when the valve portion 33a is positioned on the side of the opening of the upstream side passage 43 in the circumferential direction (see, FIG. 5).

The valve body 33 generates a negative pressure in the EGR chamber 42 by restricting an inflow of air into the valve chamber 42 such that the exhaust gas is introduced into the intake passage 19 from the EGR passage 32. Further, the valve body 33 changes a state of the negative pressure by changing the amount of inflow of air into the valve chamber 42 based on the rotation position of the valve body 33 such that the amount of introduction air of the exhaust gas into the intake pipe 14 can be changed.

Namely, regarding the introduction of the exhaust gas into the intake passage 19, it is difficult to utilize the negative pressure generated in the engine body 3 at the intake passage 19 in the upstream side of the compressor 20. Alternatively, the exhaust gas can be introduced into the intake passage 19, because the negative pressure is generated by restricting an inflow of air by the valve body 33.

One end in the axial direction of the housing body 34A is closed by a sensor cover 51 and the other end in the axial direction of the housing body 34A is closed by a bottom cover 52. The sensor cover 51 in the detection part 38 has a hole IC 53 (Integrated Circuit) and the like. In the following description, in the circumferential direction, a side of closing the opening of the upstream side passage 43 is referred to as one side, and a side of closing the opening 35b of the cylindrical body 35 is referred to as the other side.

Figure 7:
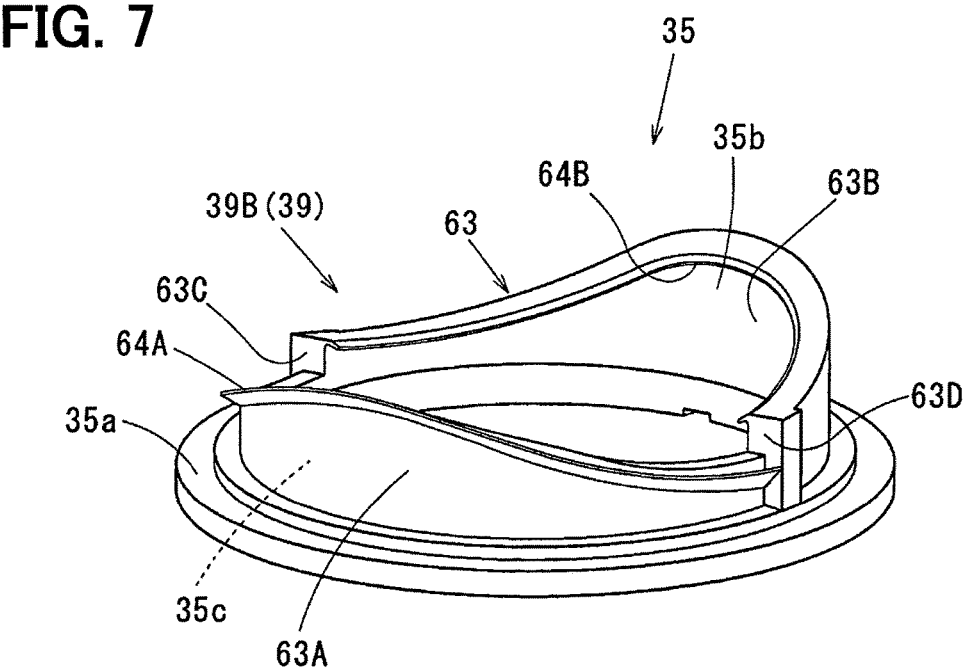
FIG. 7 is a diagram illustrating a perspective view of a cylindrical body in the first embodiment.

The cylindrical body 35 is separate from the housing body 34A, and is made of for example, a stainless steel. The cylindrical body 35 is housed in the housing space 45, and the inner periphery of the cylindrical body 35 forms a part of the EGR passage 32 (see, FIGS. 5 and 6). As shown in FIG. 7, the cylindrical body 35 is formed as a cylindrical shape, and has openings at both end thereof and a flange 35a provided around one opening. The cylindrical body 35 is provided in the housing space 45 in such a manner that the opening 35b in the opposite side of the opening around which the flange 35a is provided faces the valve chamber 42. The valve body 33 opens or closes the opening 35b by means of the valve portion 33a such that the EGR passage 32 is opened or closed with respect to the intake passage 19.

Figure 9:
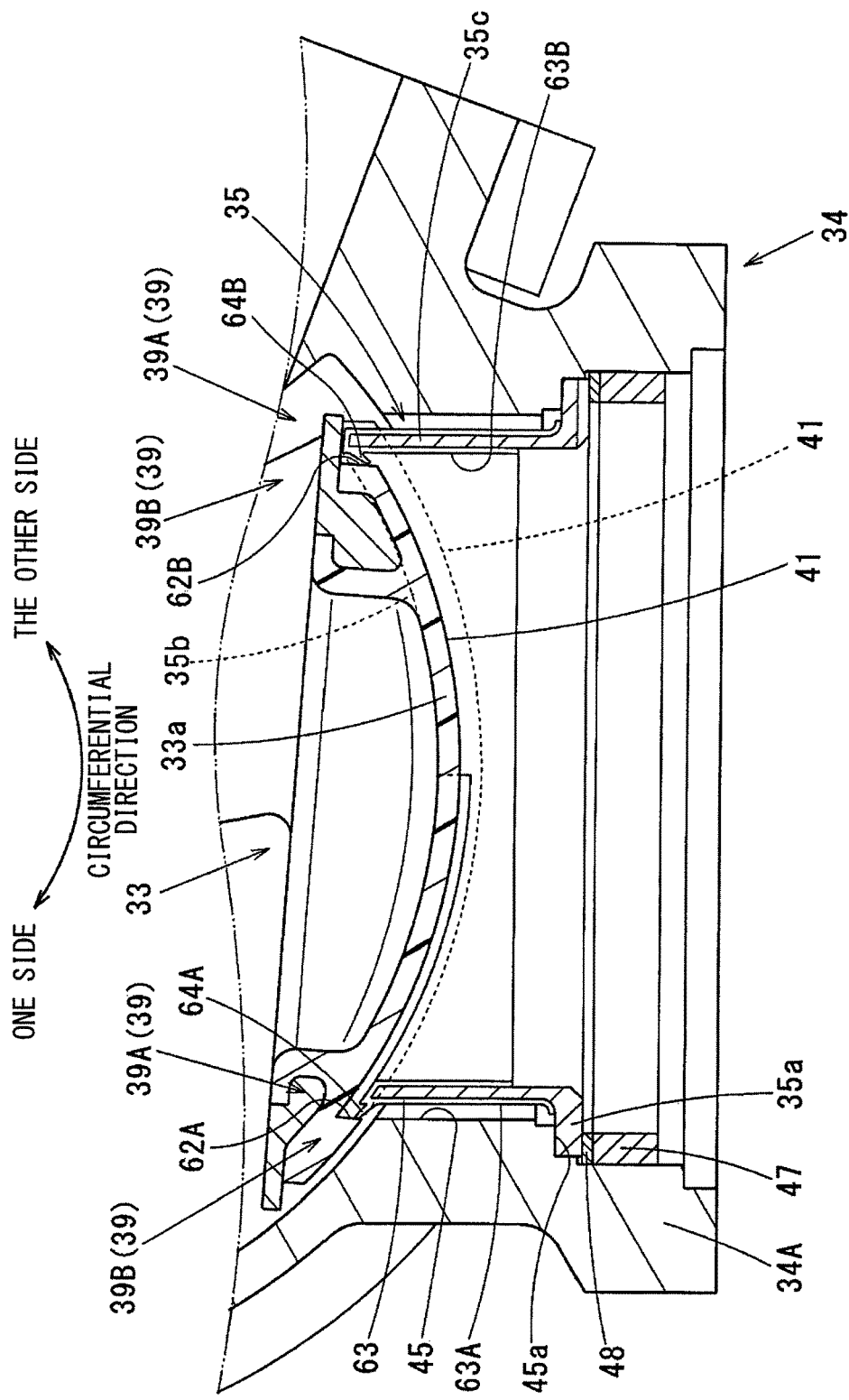
FIG. 9 is a diagram illustrating a partial cross sectional view showing a main part of the valve device in the first embodiment.
Figure 10:
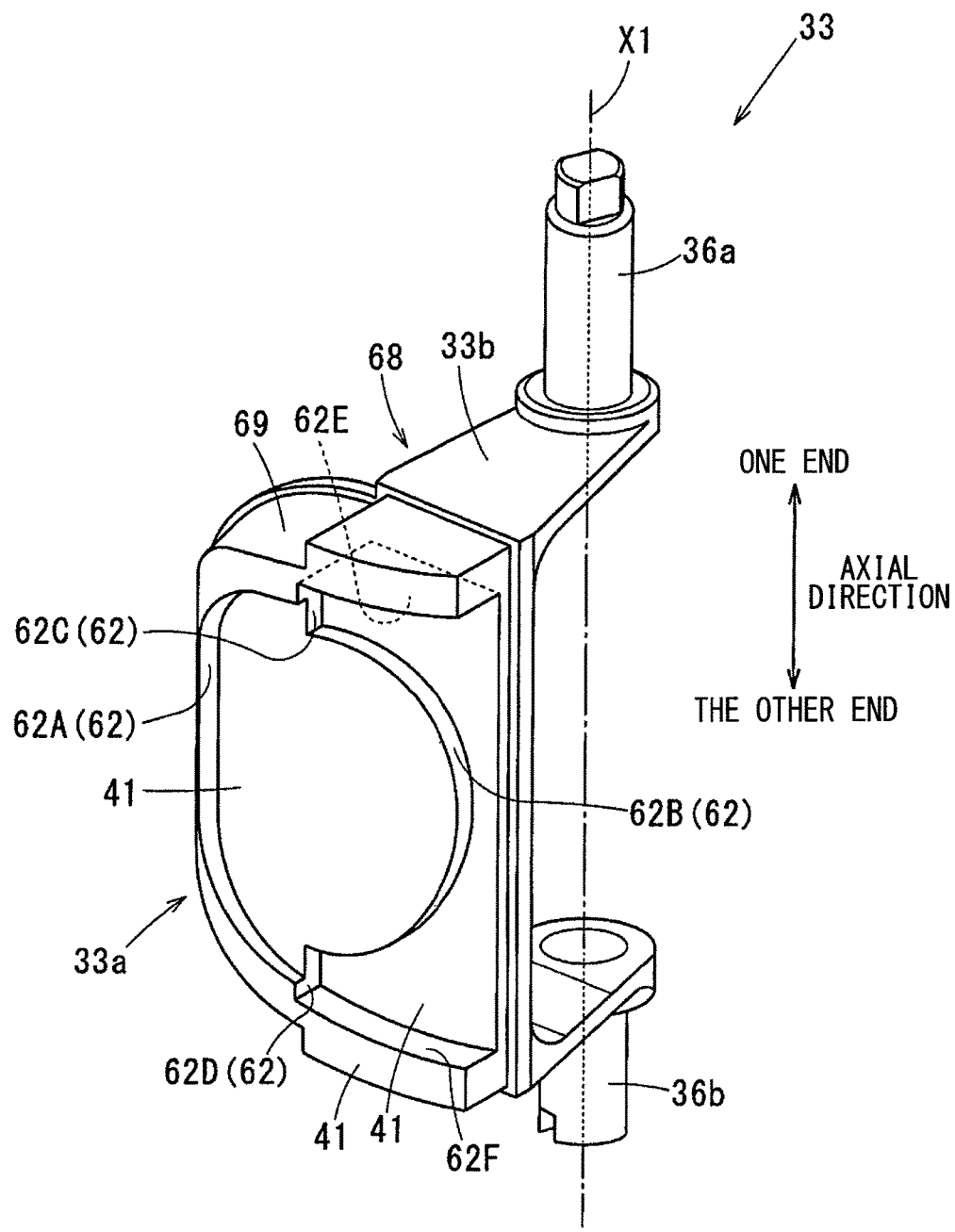
FIG. 10 is a diagram illustrating a perspective view of the valve body in the first embodiment.
Figure 11A:
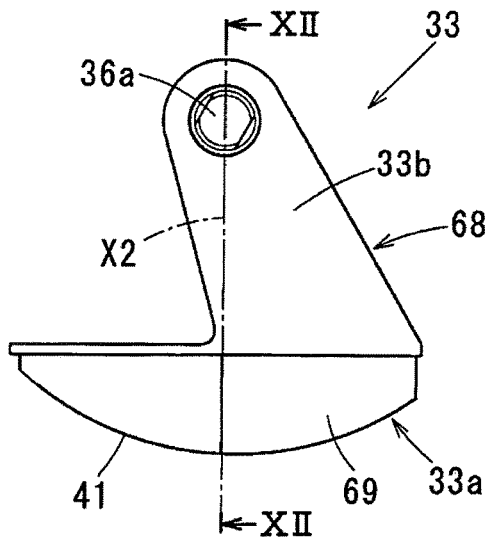
FIG. 11A is a diagram illustrating a side view of the valve body and FIG. 11B is a diagram illustrating a front view of the valve body in the first embodiment.
Figure 11B:
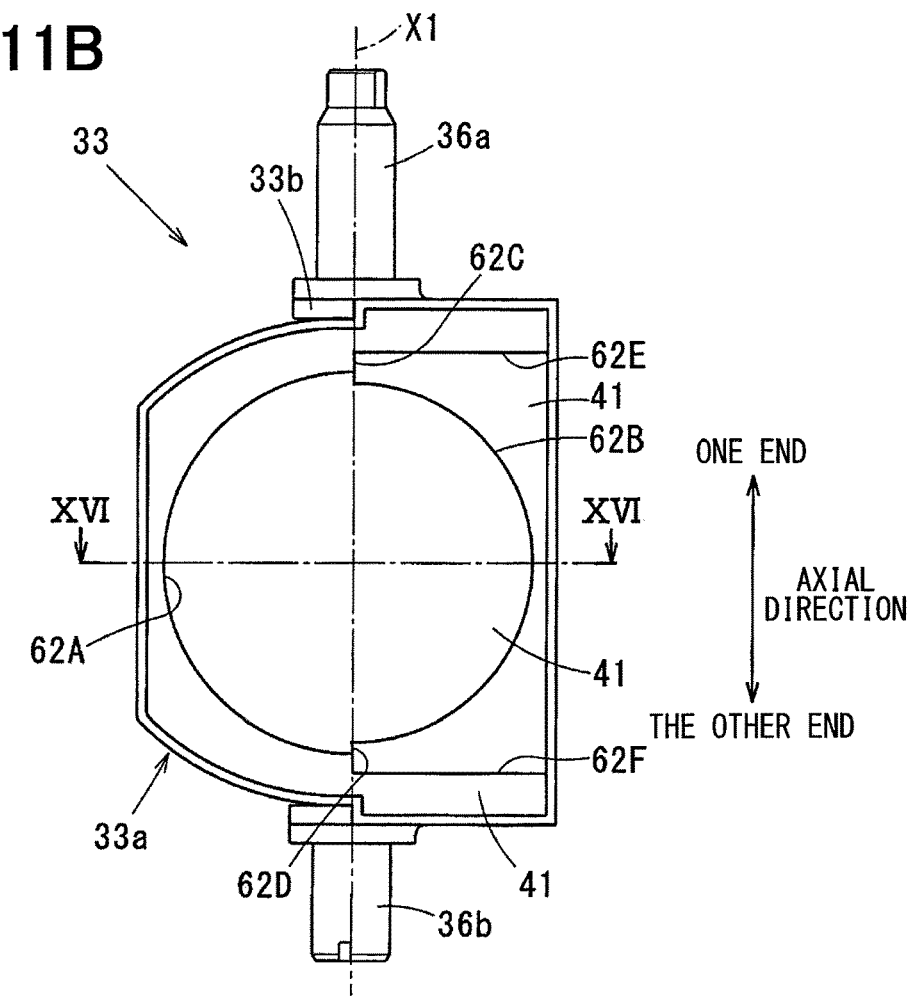

The cylindrical body 35 is housed in the housing space 45 in such a manner that the flange 35a is in contact with a step 45a formed in the housing space 45 (see, FIG. 9). At this time, the cylindrical body 35 is fixed to the housing body 34A by press-fitting of a ring 47 into the housing body 34A, and the ring 47 presses the flange 35a against the step 45a via a wave washer 48.

Figure 3:
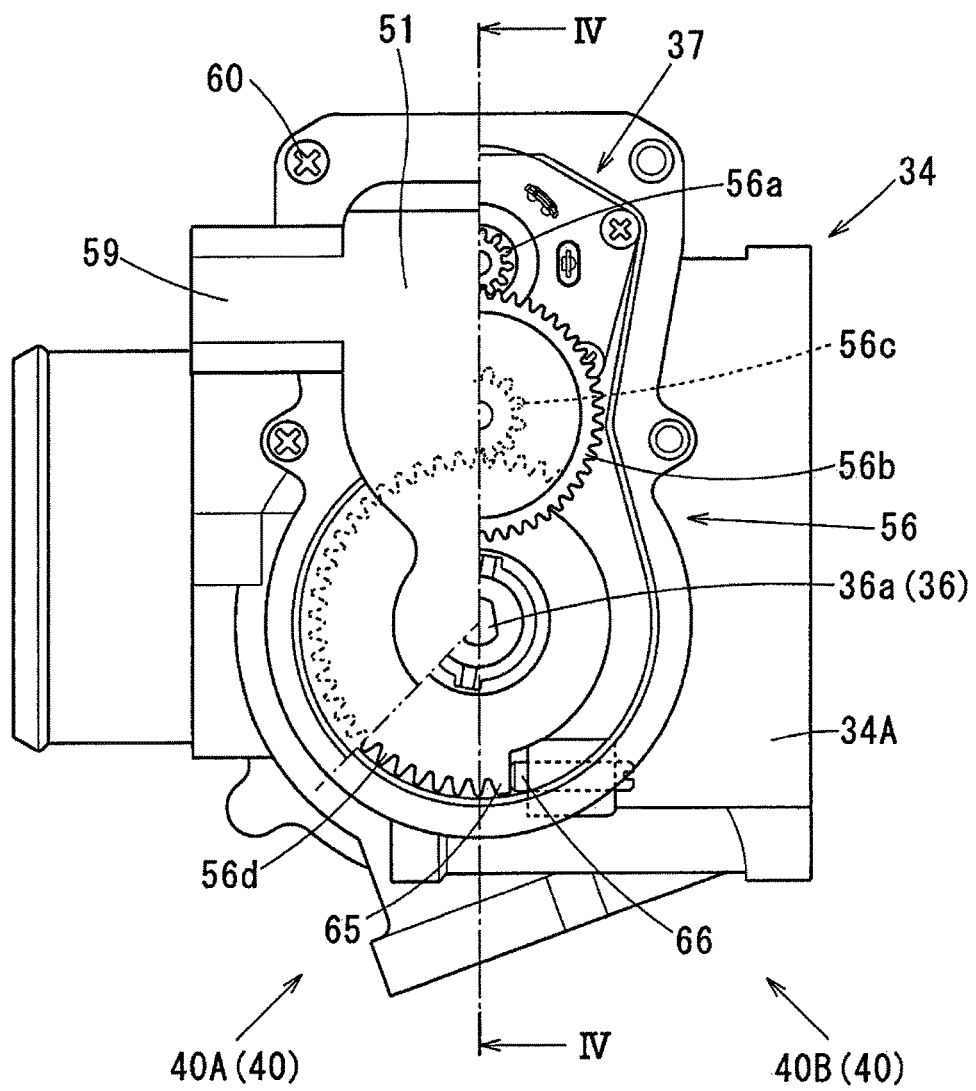
FIG. 3 is a diagram illustrating a front view showing an interior of the valve device in the first embodiment.

The driving part 37 includes a motor 55 and the reduction gear 56 (see, FIGS. 3 and 4).

The motor 55 is, for example, a DC motor having a sliding contact structure between a brush and a commutator and an ECU (not shown) controls energization of the DC motor such that the DC motor generates a torque to rotate the valve body 33 on one side in the circumferential direction (that is, one side in a direction opening the EGR passage 32 with respect to the intake passage 19).

The reduction gear 56 is composed of a gear train for reducing the rotation speed of the motor 55 and transmitting the speed to the shaft 36a, and amplifies the torque of the motor 55 according to the reduction ratio and transmits the torque to the shaft 36a. The gear train includes a pinion gear 56a attached to an output shaft of the motor 55, an intermediate reduction gear 56b meshing with the pinion gear 56a, a small-diameter gear 56c supported on a common center shaft supporting the intermediate reduction gear 56b and rotating integrally with the intermediate reduction gear 56b, and a valve gear 56d meshing with the small-diameter gear 56c, and the valve gear 56d is fastened to an end of the shaft 36a.

A return spring 57 is attached between the valve gear 56d and the housing body 34A such that the valve body 33 is biased toward the other side in the circumferential direction (that is, a side in a direction closing the EGR passage 32 with respect to the intake passage 19).

The detection part 38 has a magnet 58 which is fixed to the valve gear 56d and rotates together with the shaft 36 and the valve gear 56d, and the hall IC 53 for generating an electric signal according to the magnetic flux density of the magnetic field generated by the magnet 58, and the like.

Figure 2:
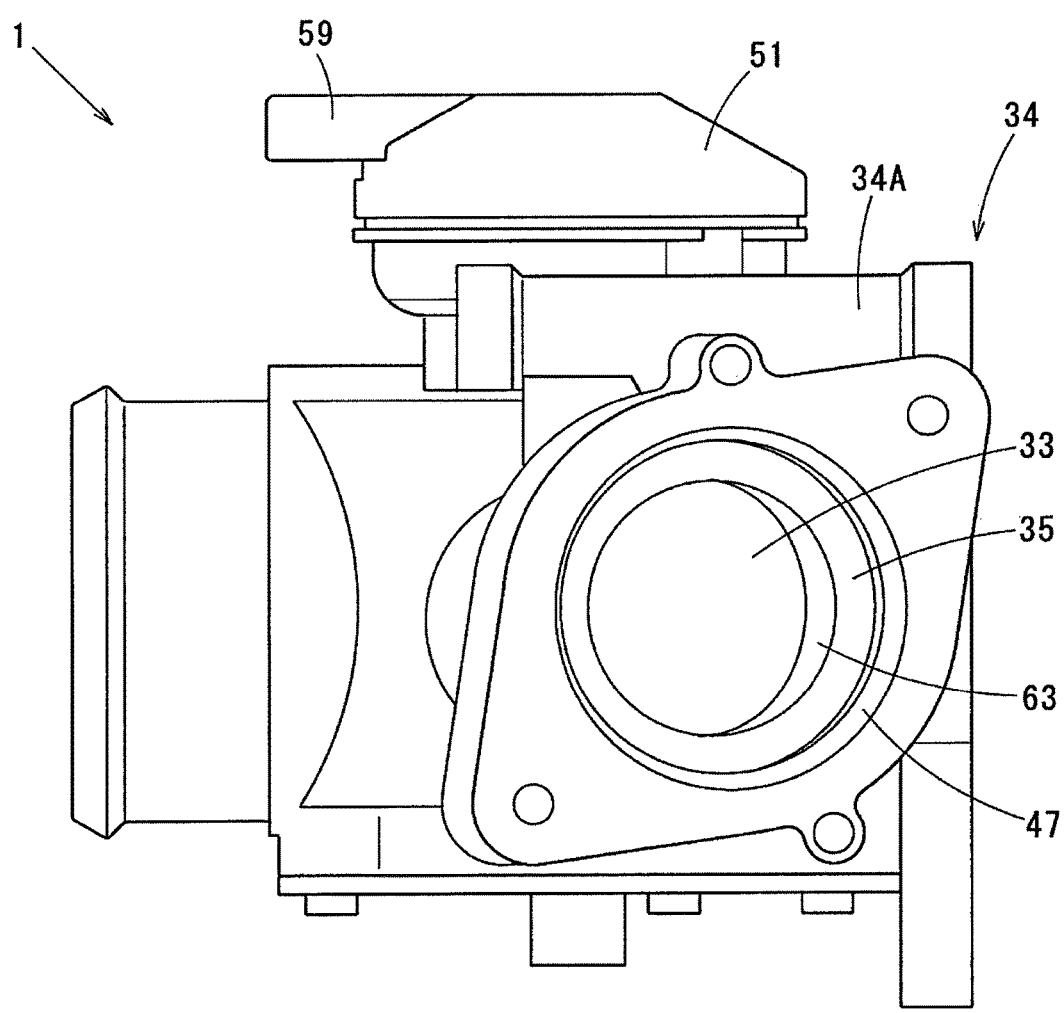
FIG. 2 is a diagram illustrating a side view of the valve device in the first embodiment.

The hall IC 53 is assembled to the sensor cover 51 and the sensor cover 51 has a connector 59 for inputting or outputting a signal between the valve device 1 and the ECU (see, FIG. 2). The sensor cover 51 is fixed to the housing body 34A by a screw 60 (see, FIG. 3).

The ECU preforms a feedback control in such a manner that a rotation angle of the valve body 33 detected by the detection part 38 coincide with a target value. The target value of the rotation angle is set in accordance with an operation state of the combustion engine 2.

A stopper part 40 includes a first stopper part 40A on a rotational side in the valve gear 56d and a second stopper part 40B on a stationary side in the housing body 34A, and when the EGR passage 32 is closed, the second stopper part 40B regulates the rotation of the first stopper part 40A such that the rotation of the valve body 33 is regulated.

The first stopper part 40A is provided on the other side of the gear arranged on the outer peripheral edge of the valve gear 56d, and is formed as a projection portion 65 protruding outwardly, separately from the crest of the gear (see, FIG. 3).

The second stopper part 40B on the stationary side is a screw 66 fixed to a screw hole in the housing body 34A (see, FIG. 3).

A protrusion which is formed as a portion of the screw 66 protruding from the screw hole 65 contacts the other side surface of projection portion 65 such that the rotation of the valve body 33 is restricted by restricting the rotation of the valve gear 56d.

Feature in the First Embodiment

A characteristic of the valve device 1 in the first embodiment is described with reference to FIGS. 1 to 19.

The valve device 1 includes the seal part 39 as explained below.

The seal part 39 has a first seal part 39A on the rotation side in the valve body 33 and a second seal part 39B on the stationary side in the cylindrical body 35, and when the EGR passage 32 is closed, the first seal part 39A presses the second seal part 39B so as to maintain the closing state (see, FIGS. 8 and 9).

The first seal part 39A is provided on the outer peripheral surface 41 of the valve body 33, and more specifically, the first seal part 39A is cylindrical surfaces 62A, 62B and stepped surfaces 62C, 62D (see, FIGS. 8 and 9). Here, the cylindrical surfaces 62A, 62B are formed as semi-cylindrical shape having a center angle of 180 degrees, and a radius of the cylindrical surface 62A is larger than the radius of the cylindrical surface 62B. The cylindrical surfaces 62A, 62B are coaxial with each other and a central axis of the cylindrical surfaces 62A, 62B is orthogonal to the rotation axis X1.

The cylindrical surface 62A is an inner peripheral surface facing toward the other side in the circumferential direction, the cylindrical surface 62B is an outer peripheral surface facing toward the other side in the circumferential direction (see, FIGS. 8 and 9). The stepped surfaces 62C, 62D are formed as a plane facing toward the other side in the circumferential direction and are orthogonal to the cylindrical surfaces 62A, 62B at the both ends of the cylindrical surfaces 62A, 62B, and a normal line of the stepped surfaces 62C, 62D can be orthogonal to the rotation axis x1 by parallelly moving the normal line.

The seal part 39B is provided on a cylindrical tip 35c which is formed as the opening 35b in the cylindrical body 35, and is constructed in such a manner that a rubber seal part 63 covers the inner and outer peripheral surfaces of the cylindrical tip 35c and the end surface thereof (see, FIGS. 7 to 9). More specifically, the seal part 39B includes seal lips 64A, 64B respectively provided on the cylindrical surfaces 63A, 63B in the rubber seal part 63, and stepped surfaces 63C, 63D.

Here, the cylindrical surfaces 63A and 63B are formed as a semi-cylindrical shape with a center angle of 180 degrees, and a radius of the cylindrical surface 63A is larger than the radius of the cylindrical surface 63B. The cylindrical surfaces 63A, 63B are coaxial with each other and a central axis of the cylindrical surfaces 63A, 63B is orthogonal to the rotation axis X1. The cylindrical surface 63A is an outer peripheral surface facing toward one side in the circumferential direction and the cylindrical surface 63B is an inner peripheral surface facing toward the other side in the circumferential direction.

The stepped surfaces 63C and 63D are flat surfaces facing toward one side in the circumferential direction and are orthogonal to the cylindrical surface 63A, 63B at the both ends of the cylindrical surface 63A, 63B, and a normal line of the stepped surfaces 63C, 63D can be orthogonal to the rotation axis X1 by moving the normal line in parallel.

The seal lip 64A is provided so as to protrude toward the outer peripheral side on the cylindrical surface 63A and is elastically deformed while being brought into pressure contact with the cylindrical surface 62A (see, FIG. 9). The seal lip 64B is configured to protrude toward the inner peripheral side on the cylindrical surface 63B and is elastically deformed while being brought into pressure contact with the cylindrical surface 62B (see, FIG. 9).

The stepped surfaces 63C, 63D are respectively brought into pressure contact with the stepped surfaces 62C, 62D (see, FIGS. 7 and 8).

The seal part 39A is separated from the seal part 39B when the EGR passage 32 is opened, and the valve body 33 approaches the seal part 39B when the valve body 33 rotates in a direction closing the EGR passage 32. Finally, the seal part 39A is brought into pressure contact with the seal part 39B such that the EGR passage 32 is closed. That is, when the valve body 33 rotates in a closing direction of the EGR passage 32 from a state where the EGR passage 32 is mostly opened, the cylindrical surfaces 62A, 62B approach the seal lips 64A, 64B without being brought into contact with the seal lips 64A, 64B, respectively.

In the meantime, the stepped surfaces 62C, 62D approach the stepped surfaces 63C, 64D respectively without being brought into contact with the stepped surfaces 63C, 64D. The cylindrical surfaces 62A, 62B are respectively brought into contact with the seal lips 64A, 64B and then the cylindrical surfaces 62A, 62B elastically deform the seal lips 64A, 64B. While the cylindrical surfaces 62A, 62B elastically deform the seal lips 64A, 64B, the stepped surfaces 62C, 62D also come into contact with the stepped surfaces 63C and 63D such that a portion forming a stepped surface 63C, 63D is compressed.

That is, the outer peripheral surface 41 of the valve body 33 is provided that the outer peripheral surface 41 is not in contact with the housing 34 other than when the EGR passage 32 is closed.

In the following description, the cylindrical surfaces 62A, 62B and the stepped surfaces 62C, 62D may be collectively referred to as a valve seal surface 62. A method for manufacturing the seal portion 63 includes a first step for arranging a cylindrical tip 35C in the mold and a second step for injecting the rubber material into the mold.

Next, as shown in FIGS. 10 to 15, the valve body 33 has a core metal 68 and the shafts 36a, 36b are respectively fastened to one end and the other end of the core metal 68 in the axial direction of the core metal 68. After a part of each of the shafts 36a, 36b is inserted into a mold, the core metal 68 is formed by die-casting. So, the shafts 36a, 36b are fastened to the core metal 68. The material of the core metal 68 is, for example, an aluminum.

The valve seal surface 62 is provided on the resin portion 69 made of a resin. That is, the valve seal surface 62 is made of a resin. The resin portion 69 is formed by inserting a part of the core metal 68 into a mold and then by performing an injection molding, and the resin portion 69 is supported by the core metal 68. It is preferable that the resin portion 69 is made of a resin material having high heat resistance, for example, a polyphenylene sulfide.

The core metal 68 constitutes a part of the valve portion 33a and the arm 33b in the valve body 33, and the resin portion 69 constitutes a part of the valve portion 33a. In other words, the valve portion 33a is composed of the core metal 68 and the resin portion 69, and the arm 33b is composed of the core metal 68.

The core metal 68 has a base body 70 which forms a skeleton of the valve portion 33a, and the arm 33b extends from both ends of the base body 70 in the axial direction. The shaft 36a, 36b are respectively fastened to one end and the other end of the arm 33b in the axial direction. The base body 70 is inserted into the mold during injection molding, and a boundary surface is formed between the base body 70 and the resin portion 69.

The base body 70 has a hole 71 penetrating along a radial direction with respect to the base body 70 and the hole 71 is filled with the resin portion 69. Here, an axis of the hole 71 crosses perpendicular to the rotation axis X (hereinafter, the axis of the hole 71 is referred to as a hole-axis X2). The surface on one side of the base body 70 in the direction of the hole-axis X2 on an outer surface of the base body 70, that is, the outer surface the base body 70 in the radial direction of the base body 70, is totally covered with the resin portion 69, such that the valve seal surface 62 is formed and the surface of the metal is not exposed at all. The valve seal surface 62 surrounds the hole-axis X2 over the entire circumference.

Figure 13:
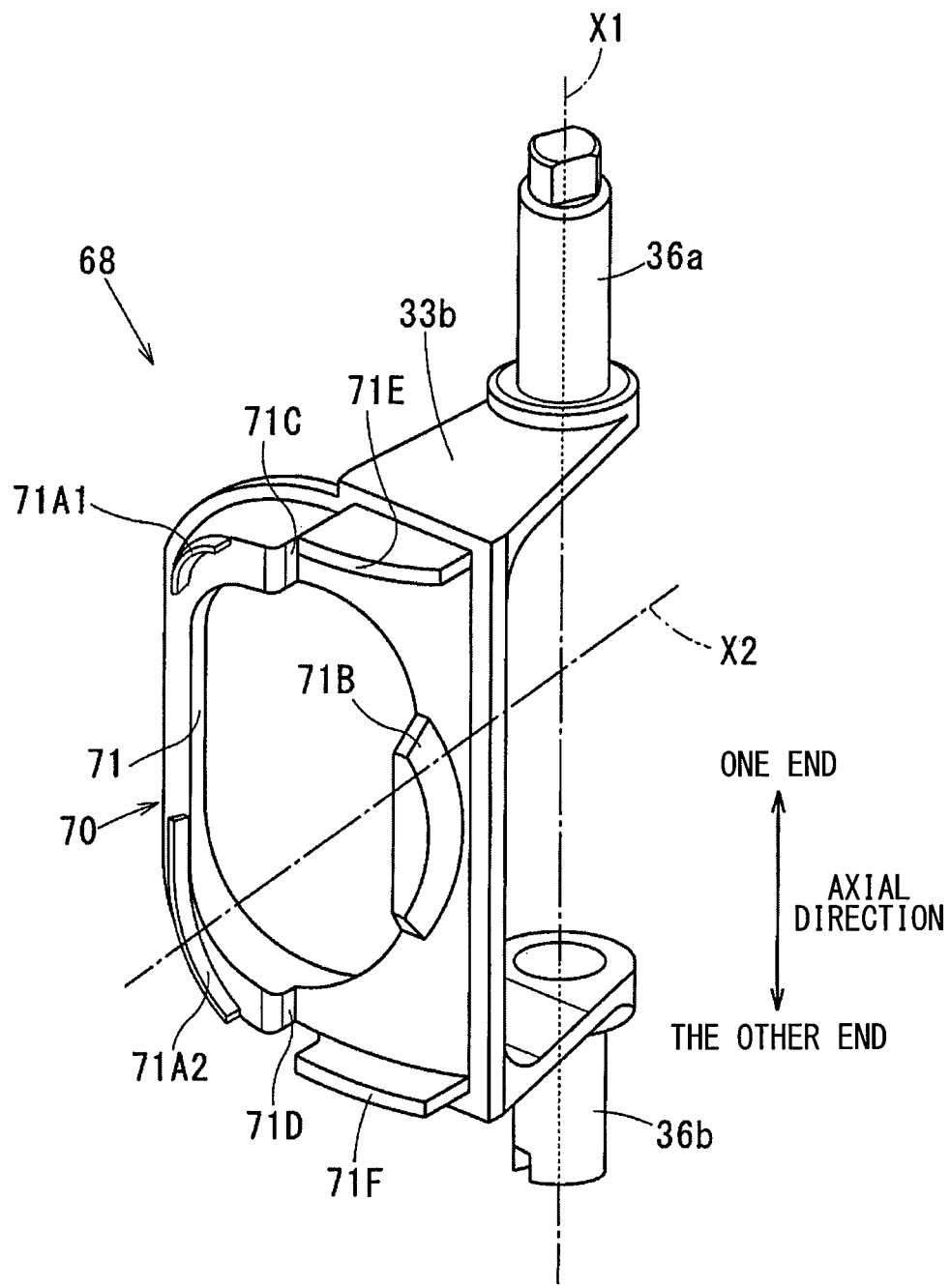
FIG. 13 is a diagram showing a perspective view of a core metal in the first embodiment.
Figure 14A:
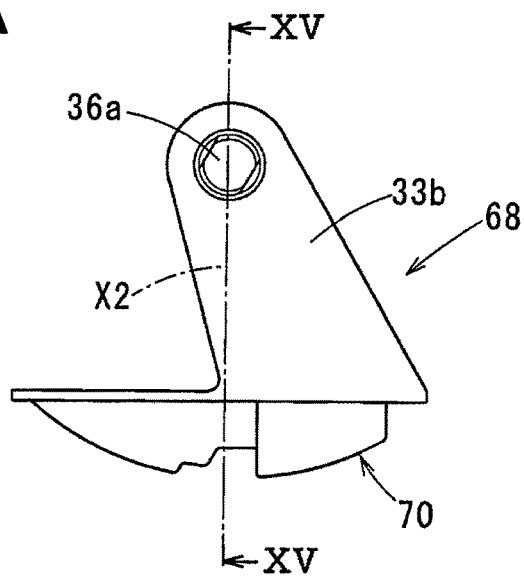
FIG. 14A is a diagram illustrating a side view of the core metal.
Figure 14B:
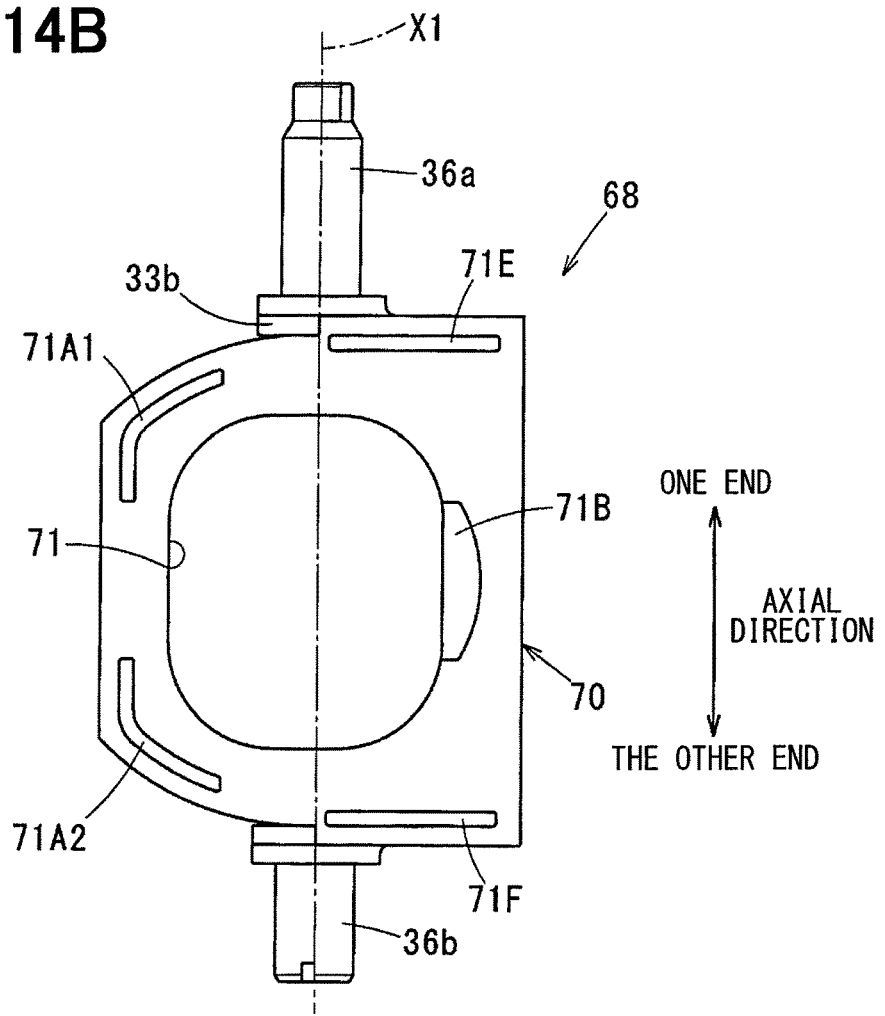
FIG. 14B is a diagram illustrating a front view of the core metal in the first embodiment.
Figure 15:
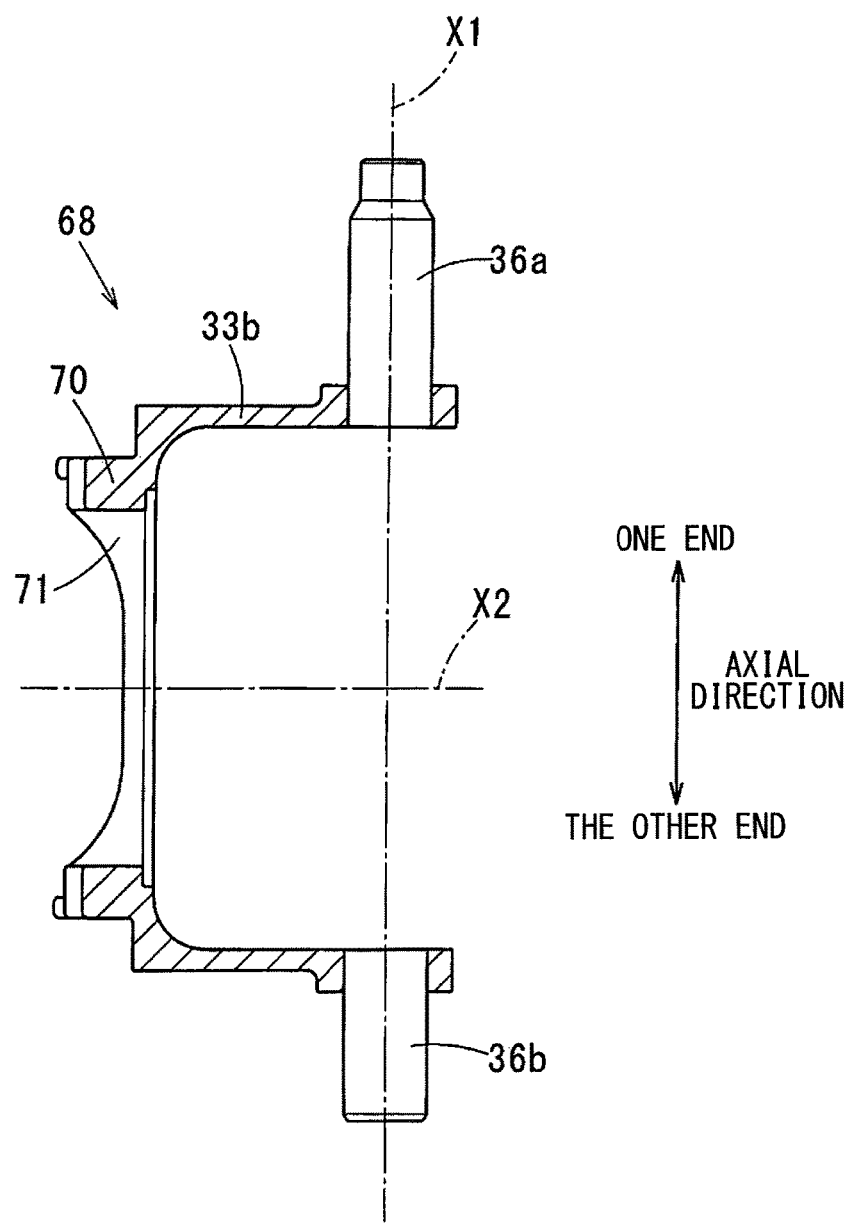
FIG. 15 is a diagram illustrating a cross sectional view taken along line XV-XV in FIG. 14 in the first embodiment.

In the base body 70, the steps 71C, 71D and the ribs 71A1, 71A2, 71B are provided around the hole 71 (see, FIGS. 13 and 14). More specifically, the steps 71C, 71D are formed on the outer surface of the base body 70 on one side in the hole-axis X2 and extend along the hole-axis X2 at a separated position from each other across the hole-axis X2. One side in the circumferential direction of the steps 71C, 71D is raised outwardly with respect to the other side. Curved arc-shaped ribs 71A1, 71A2 formed along the inner edge shape of the hole 71 are respectively formed adjacent to the steps 71C, 71D and are separated from each other on the outer surface. A curved arc-shaped rib 71B is formed between the steps 71C, 71D on an opposite side with respect to the curved arc-shaped ribs 71A1, 71A2.

Figure 16A:
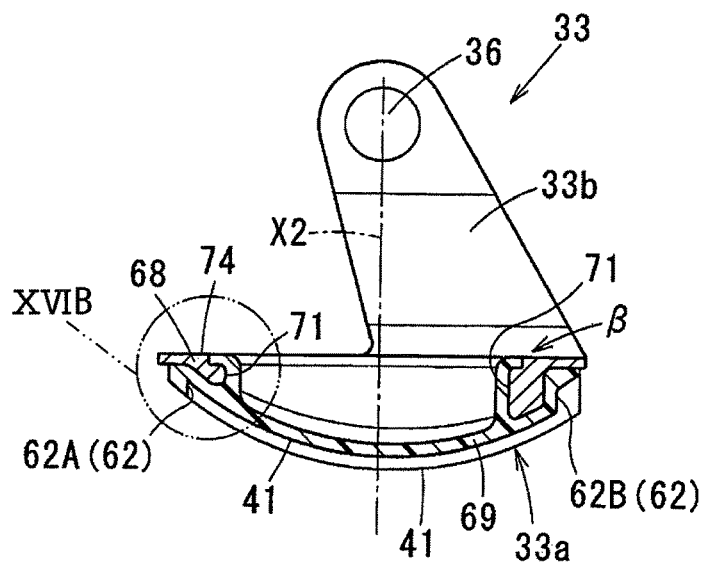
FIG. 16A is a diagram illustrating a cross sectional view taken along line XVI-XVI in FIG. 11
Figure 16B:
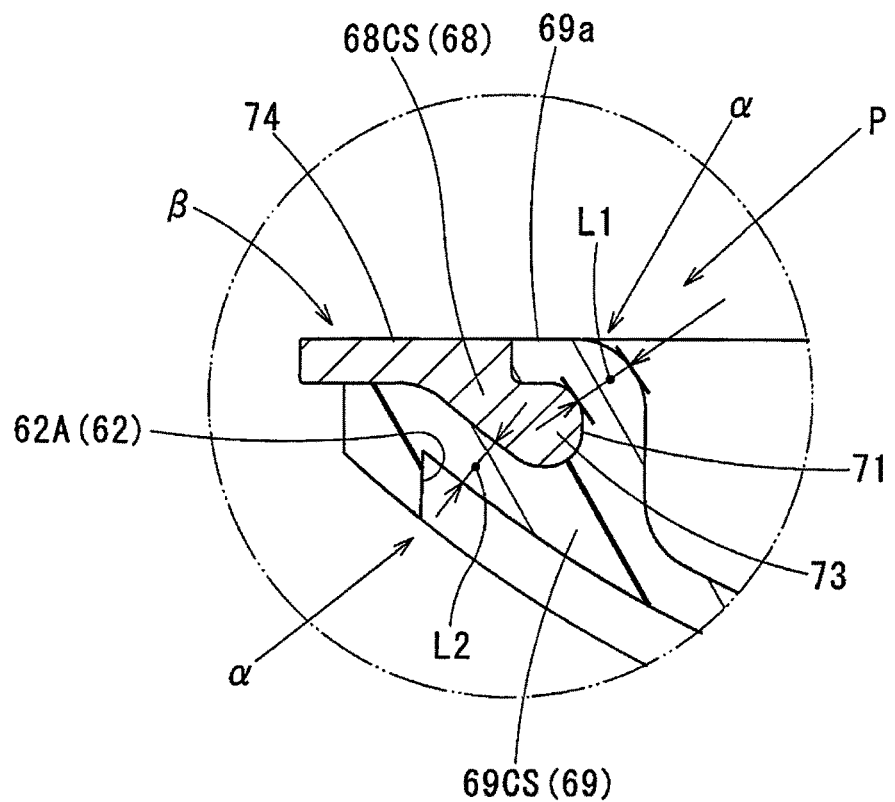
FIG. 16B is a diagram illustrating a partially enlarged view of FIG. 16A in the first embodiment.

A following pinch structure P and an uniform coating area α (alpha) are formed on the whole periphery of the hole 71 based on the shape of the ribs 71A1, 71A2, 71B and the shape of the mold used for injection molding of the resin portion 69 (see, FIG. 16). The uniform coating area α is formed for enhancing a surface roughness of the valve seal surface 62.

The pinch structure P is that the resin portion 69 interposes a part of the core metal 68. The inner periphery of the hole 71 and the ribs 71A1, 71A2, 71B are covered with the resin portion 69 such that the pinch structure P is formed as an annular shape around the periphery of the hole 71. The uniform coating area α is an area in which the thickness of the resin portion 69 on both sides for interposing the core metal 68 is same in the pinch structure P, and the uniform coating area α is annularly provided around the periphery of the hole 71. The valve seal surface 62 is located outside of a ring formed by the uniform coating area α.

Here, FIG. 16 shows a cross-sectional view of the valve body 33 taken along the hole-axis X2 designating a cross section β (beta). The valve body 33 is formed as a mirror-image symmetry shape, and the cross section β is a symmetrical surface in the mirror-image symmetry and is perpendicular to the rotation axis x1.

A cross section part 68CS of the core metal 68 in the cross section β includes a projection 73 which is a tip formed on an inner periphery of the hole 71. In the cross section β, a cross section part 69CS of the resin portion 69 protrudes from the tip of the projection 73 toward the opposite side of the tip and is formed on both sides of the projection 73 based on the presence of the pinch structure P. Furthermore, in the cross section β, some range in which lengths L1, L2 measured perpendicularly from the tangent of the projection 73 toward the outer edge of the resin portion 69 are equal to each other is in existence based on the uniform coating area α.

The cross section part of the valve seal surface 62 is formed on the opposite side of the tip with respect to the projection 73 in the uniform coating area α. The pinch structure P and the uniform coating area α are formed on the entire periphery of the hole 71 and the valve seal surface 62 is present on the entire periphery of the hole 71 and on the opposite side with respect to the tip in the uniform coating area α.

Here, the ribs 71A1, 71A2 are provided to form the uniform coating area α with respect to the cylindrical surface 62A on the valve seal surface 62, and the rib 71B is provided to form the uniform coating area α with respect to the cylindrical surface 62B.

The steps 71C, 71D correspond to the stepped surfaces 62C, 62D. The ribs 71E, 71F formed as a straight line are provided on the other side of the steps 71C, 71D in the circumferential direction of the steps 71C, 71D as well as on one side and the other side of the rib 71B in the axial direction of the rib 71B. The ribs 71E, 71F correspond to the stepped surfaces 62E, 62F perpendicular to the stepped surfaces 62C, 62D, respectively (see, FIG. 8, FIG. 10 and FIG. 11). The stepped surfaces 62E, 62F receives the sliding contact of the outerperipheral surface of the rubber seal part 63, when the valve body 33 rotates toward the closing side. So, the stepped surfaces 62E, 62F have a function of enhancing the sealing capability when fully closed.

Figure 12:
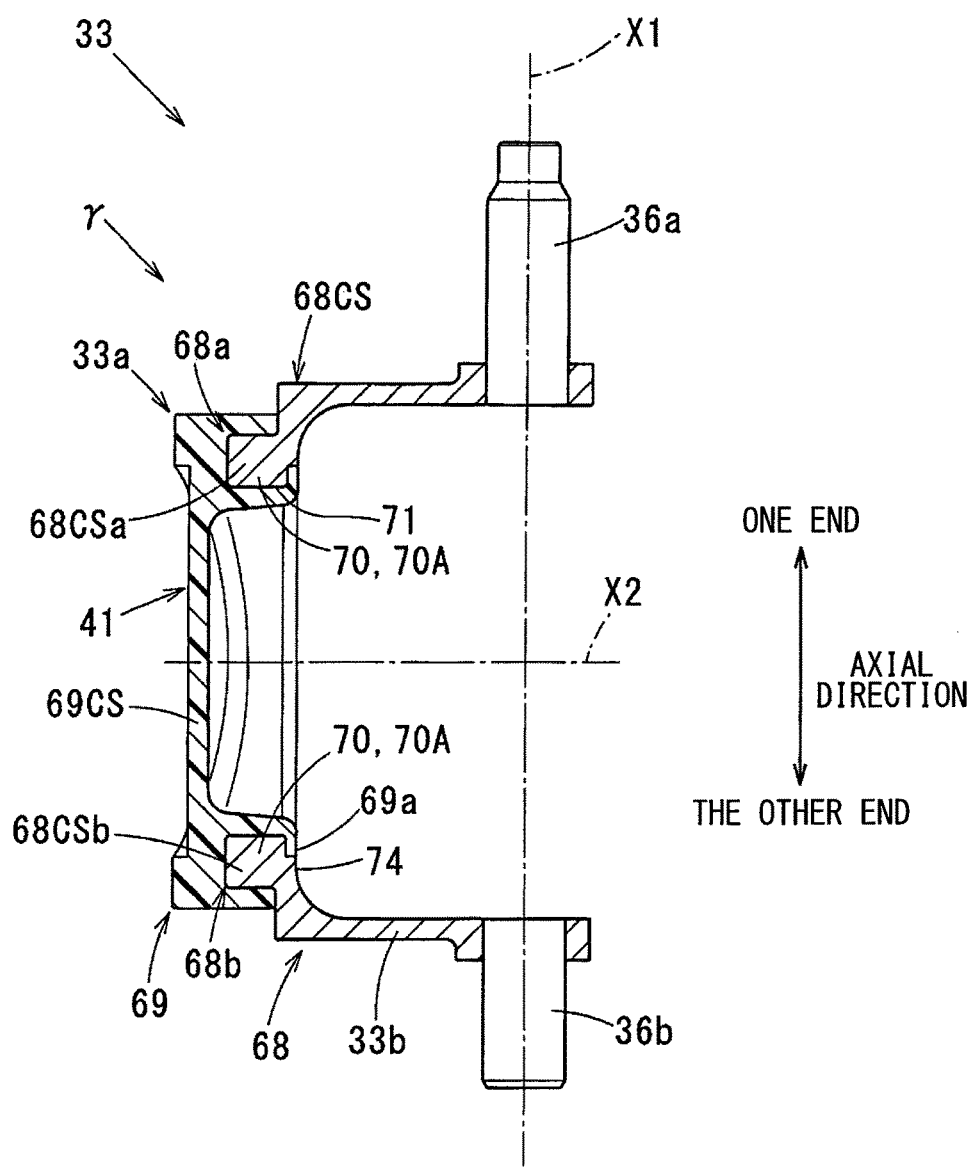
FIG. 12 is a diagram illustrating a cross sectional view taken along line XII-XII in FIG. 11 in the first embodiment.
Figure 17:
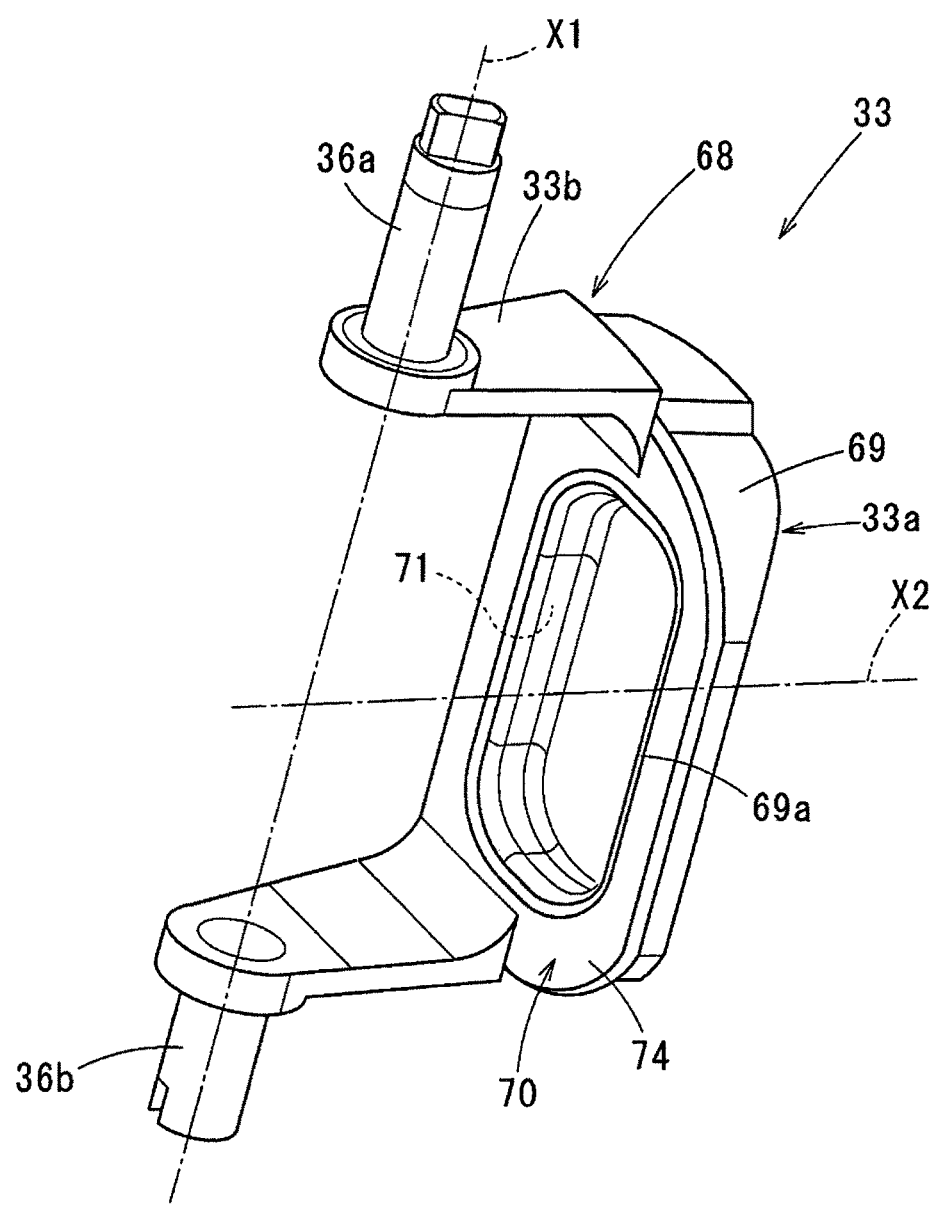
FIG. 17 is a diagram illustrating a perspective view of the valve body in the first embodiment.
Figure 18:
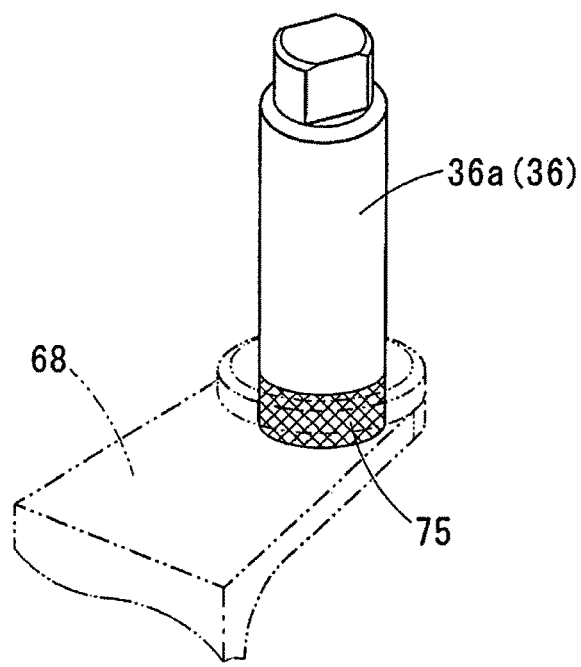
FIG. 18 is a diagram illustrating a perspective view of a shaft in the first embodiment.

The core metal 68 has a metal surface 74 exposed without being covered with the resin portion 69 (see, FIG. 12, FIG. 16 and FIG. 17).

When the outer peripheral surface 41 is provided on the surface on the front side of the valve body 33, the metal surface 74 is provided on the the surface on the rear side, that is, on the surface on the inner peripheral side in the radial direction. In other words, on the surface of the other side in the direction of the hole-axis X2, that is, on the surface on the inner peripheral side in the radial direction of the base 70, the metal surface 74 is provided without being covered with the resin portion 69. The metal surface 74 surrounds the hole-axis X2.

In the resin surface formed by the resin portion 69 on the surface of the valve body 33 in the rear side of the valve body 33, the region 69a in the resin portion 69 is formed by covering the surface of the rear side of the core metal 68 (see, FIG. 12, FIG. 16 and FIG. 17). On the entire periphery of the hole 71 the resin portion 69 covers the inner wall of the hole 71 between the outer peripheral end in the radial direction and the inner peripheral end in the radial direction, and the resin portion 69 has the region 69a extending in the direction away from the hole-axis X2 at the inner peripheral end in the radial direction (see, FIG. 12, FIG. 16 and FIG. 17).

When the base body 70 is regarded as a cylindrical part 70A for forming the hole 71, the inner surface and the outer surface of the cylindrical part 70A are covered with the resin portion 69 at least at two positions around the circumference of the cylindrical part 70A (see, FIG. 12).

When a cross section γ (gamma) is assumed as a cross section of the valve body 33 taken along both the rotational axis X1 and the hole-axis X2 (see, FIG. 12), in the cross section γ the cross section part 68CS of the core metal 68 has one end in the axial direction and the other end in the axial direction (one end in the axial direction of the cross section part 68CS in the cross section γ is referred to as the cross section part 68CSa and the other end in the axial direction of the cross section part 68CS in the cross section γ is referred to as the cross section part 68CSb). Parts corresponding to the cross section part of the base body 70 in the cross section parts 68CSa, 68CSb are connected with the cross section part 69CS of the resin portion 69.

The cross section part 69CS is branched into inner regions interposed between the cross section parts 68CSa, 68CSb and outer regions positioned outside of the cross section parts 68CSa, 68CSb around each of the periphery of the cross section parts 68CSa, 68CSb. Namely, in the periphery of each of the cross section parts 68CSa, 68CSb, the cross section part 69CS extends to be branched in one direction of the axial direction and in the other direction of the axial direction along each of the cross section parts 68CSa, 68CSb.

[Manufacturing Method]

The method for manufacturing the valve device 1 in the first embodiment is explained below.

In the manufacturing method of the valve device 1, the core metal 68 is formed as a metal, and the shafts 36a, 36b are fixed to both ends of the core metal 66 in the axial direction of the core metal 66, and the valve seal surface 62 is formed as a resin.

The manufacturing method of the valve device 1 has a core metal molding step of die-casting the core metal 68, and a resin molding step of molding the resin portion 69 including the valve seal surface 62. In the core metal molding step, the core metal 68 is die-casted after the shafts 36a, 36b are inserted in the mold, and in the resin molding step the resin portion 69 is injection-molded after the part of the core metal is inserted in the mold.

Here, each of the shafts 36a, 36b has a knurling 75 (see, FIG. 18), and in the core metal molding step a part including the knurling 75 of the shafts 36a, 36b is inserted in the mold so as to mold the core metal 68.

Figure 19:
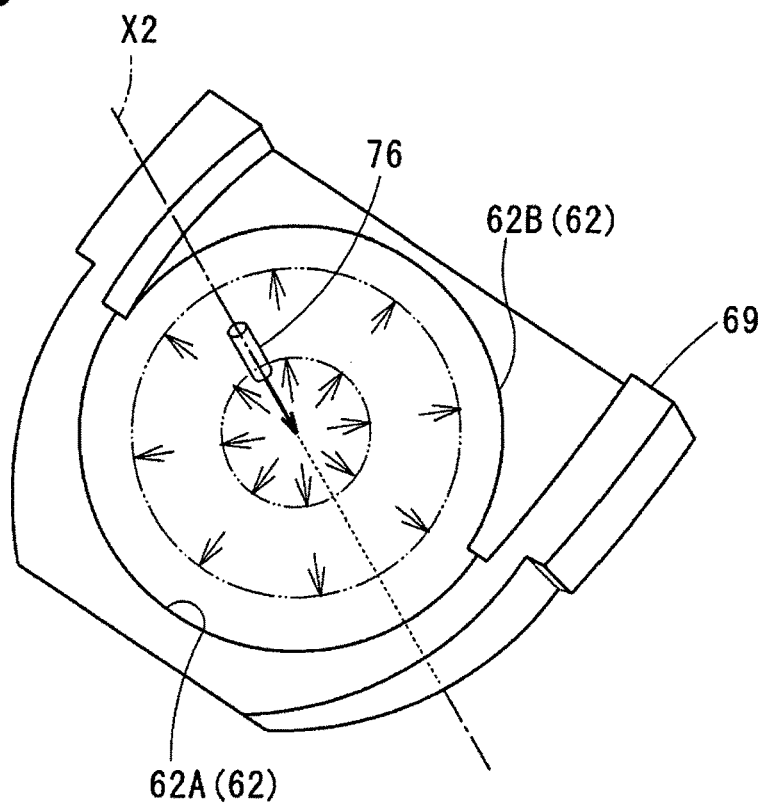
FIG. 19 is a diagram illustrating a position of a resin gate in the first embodiment.

In the resin molding step one resin gate 76 is provided at a position where the average value of the distances from the valve seal surface 62 is minimized, namely on the hole-axis X2 (see, FIG. 19).

Effect of First Embodiment

According to the valve device 1 in the first embodiment, the shafts 36a, 36b are rotationally driven, and the valve body 33 rotates together with the shafts 36a, 36b and has the cylindrical surface on the outer peripheral surface 41. The housing 34 has the valve chamber 42 in which the valve body 33 is rotatably accommodated, and the valve chamber 42 has the opening 35b opened or closed by the valve body 33.

The outer peripheral surface 41 is provided to be in a non-contact with the housing 34. The valve body 33 has the valve seal surface 62 for closing the opening 35b by abutting on a predetermined part set in the housing 34 when the opening 35b is fully closed, and the valve seal surface 62 is directed in the circumferential direction. The valve body 33 has the core metal 68 made of a metal, and the shafts 36a, 36b are provided on both ends of the core metal 68, and the valve seal surface 62 is made of a resin.

Since the core metal 68 for supporting the shafts 36a, 36b is made of a metal, the deformation of the core metal 68 due to the temperature change can be suppressed such that the positions of the shafts 36a, 36b can be accurately maintained. Since the valve seal surface 62 is made of a resin, the surface accuracy of the valve seal surface 62 can be secured by a die removal without performing cutting. In the rotary-type valve device 1, the shafts 36a, 36b can be supported with high accuracy and the accuracy of the valve seat surface 62 can be secured at a low cost.

Portions where the valve seal surface 62 abuts when the opening 35b is fully closed are the seal lips 64A, 64B, and the seal lips 64a, 64b are provided on the cylinder tip 35c on the side of the housing 34.

Thus, in the case of adopting a seal method by pushing down the lip, it is not necessary to have an undercut around the lip. That is, if the lip is provided on the side of the valve body 33, an undercut is required, so the mold removal is difficult. On the other hand, since the seal lips 64A, 64B are provided on the cylinder tip 35c on the side of a housing 34, the undercut is not necessary and it is possible to adopt the seal method by pushing down the lip.

The uniform coating area α is annularly provided around the whole periphery of the hole 71 in the core metal 68, and the valve seal surface 62 is located outside of the uniform coating area α in the radial direction from the periphery of the hole-axis X2. More specifically, when the projection 73 is regarded as the inner peripheral edge of the hole 71 and the side where the projection 73 protrudes is regarded as the tip side, the valve seal surface 62 is present on the opposite side of the tip side in the uniform coating area α on one side of the projection 73.

Furthermore, the accuracy of the valve seat surface 62 can be secured, so, the pushing-down amount of the seal lips 64A, 64B can be made more uniform. Accordingly, the fatigue strength of the seal lips 64A, 64B can be secured.

The hole 71 is filled with the resin portion 69, and the outer surface of the base body 70 in the radial direction of the base body 70 is covered with a resin portion 69 such that the valve seal surface 62 is formed. On the inner surface of the base body 70 the metal surface 74 surrounds the hole-axis X2.

Thereby, since the occurrence of weld in the resin portion 69 can be prevented, the strength can be secured against stress generated in a cold environment in which the low temperature and the high temperature are repeated.

On the resin surface formed by the resin portion 69 on the surface of the rear side of the valve body 69, the region 69*a* is formed by a portion covering the surface of the rear side of the core metal 68.

The core metal 68 can be hooked by the portion forming the region 69*a*. The resin portion 69 can be prevented from falling off due to a difference in linear expansion between the core metal 68 and the resin portion 69.

In the following explanation, the structure for preventing the core metal 68 from falling off by hooking the core metal 68 by means of the resin portion 69 is referred to as a falling-off prevention structure.

Furthermore, when the base body 70 is regarded as the cylindrical part 70A forming the hole 71 (see, FIG. 12), the inner surface and the outer surface of the cylindrical part 70A are covered with the resin portion 69 at least at two positions on the outer periphery of the cylindrical part 70A. Namely, when a cross section γ is assumed as a cross section of the valve body 33 taken along both the rotational axis X1 and the hole-axis X2 (see, FIG. 12), in the cross section γ the cross section part 68CS of the core metal 68 is divided into the cross section part 68CSa on one end in the axial direction and the cross section part 68CSb on the other end in the axial direction.

Due to a shrinkage of the resin portion 69 at low temperature, the resin portion 69 on one side in the axial direction of the part 68*a* corresponding to the cross section part 68CSa presses the part 68*a* toward the other side in the axial direction, and the resin portion 69 on the other side of the part 68*b* corresponding to the cross section part 68CSb presses the part 68*b* toward one side in the axial direction such that the core metal 68 is tightened from the outside in the axial direction. Due to an expansion of the resin portion 69 at high temperature, the resin portion 69 on one side in the axial direction of the part 68*a* corresponding to the cross section part 68CSa presses the part 68*a* toward the other side in the axial direction and the resin portion 69 on the other side of the part 68*b* corresponding to the cross section part 68CSb presses the part 68*b* toward one side in the axial direction such that the core metal 68 is pulled from the inside in the axial direction.

A backlash caused by the difference in linear expansion between the core metal 68 and the resin portion 69 can be suppressed.

In the following explanation, the structure for suppressing the backlash generated between the core metal 68 and the resin portion 69 due to the tightening at low temperature and due to the pulling at high temperature, such as the resin portion 69 inside of the two positions (parts 68*a*, 68*b*) of the cylindrical part 70A and outside thereof, is referred to as a backlash suppressing structure.

Each of the shafts 36*a*, 36*b* has a knurling 75, and in the core metal molding step a part including the knurling 75 of the shafts 36*a*, 36*b* is inserted in the mold so as to mold the core metal 68.

Thereby, since the removal of the shafts 36*a* and 36*b* from the core metal 68 and the rotation of the shafts 36*a* and 36*b* relative the core metal 68 can be suppressed, the fixing force of the shafts 36*a* and 36*b* with respect to the core metal 68 can be strengthened.

In the resin molding step, since the resin is injected from sole resin gate 76, the generation of the weld in the resin portion 69 can be prevented. So, the strength can be secured against stress generated in the cold environment in which the low temperature and the high temperature are repeated.

Since the sole resin gate 76 is provided at a position where the average value of the distances from the valve seal surface 62 is minimized, namely on the hole-axis X2, it is possible to reduce the variation of orientation of a filler contained in resin on the whole circumference of the valve seal surface 62. As a result, since the accuracy of a valve seal surface 62 can be enhanced, the pushing-down amount of the seal lips 64A, 64B can be made more uniform. Accordingly, the fatigue strength of the seal lips 64A, 64B can be secured.

Second Embodiment

In the valve device 1 in the second embodiment, different parts compared to the valve device 1 in the first embodiment are mainly described.

Figure 20:
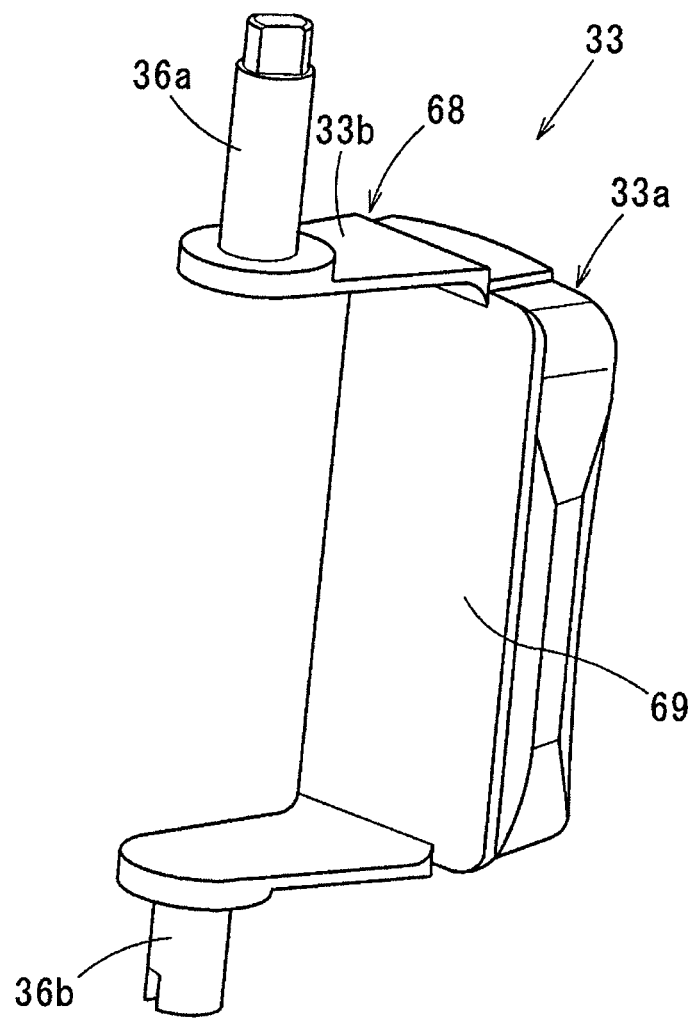
FIG. 20 is a diagram illustrating a perspective view of the valve body in a second embodiment.

As shown in FIG. 20, in the valve device 1 in the second embodiment, an outer surface of the base body 70 in the radial inner side of the base body 70 is fully covered with the resin portion 69, and the surface of the metal is not exposed.

Thereby, a corrosion of the core metal 68 can be suppressed.

Third Embodiment

In the valve device 1 in the third embodiment, different parts compared to the valve device 1 in the first embodiment are mainly described.

Figure 21:
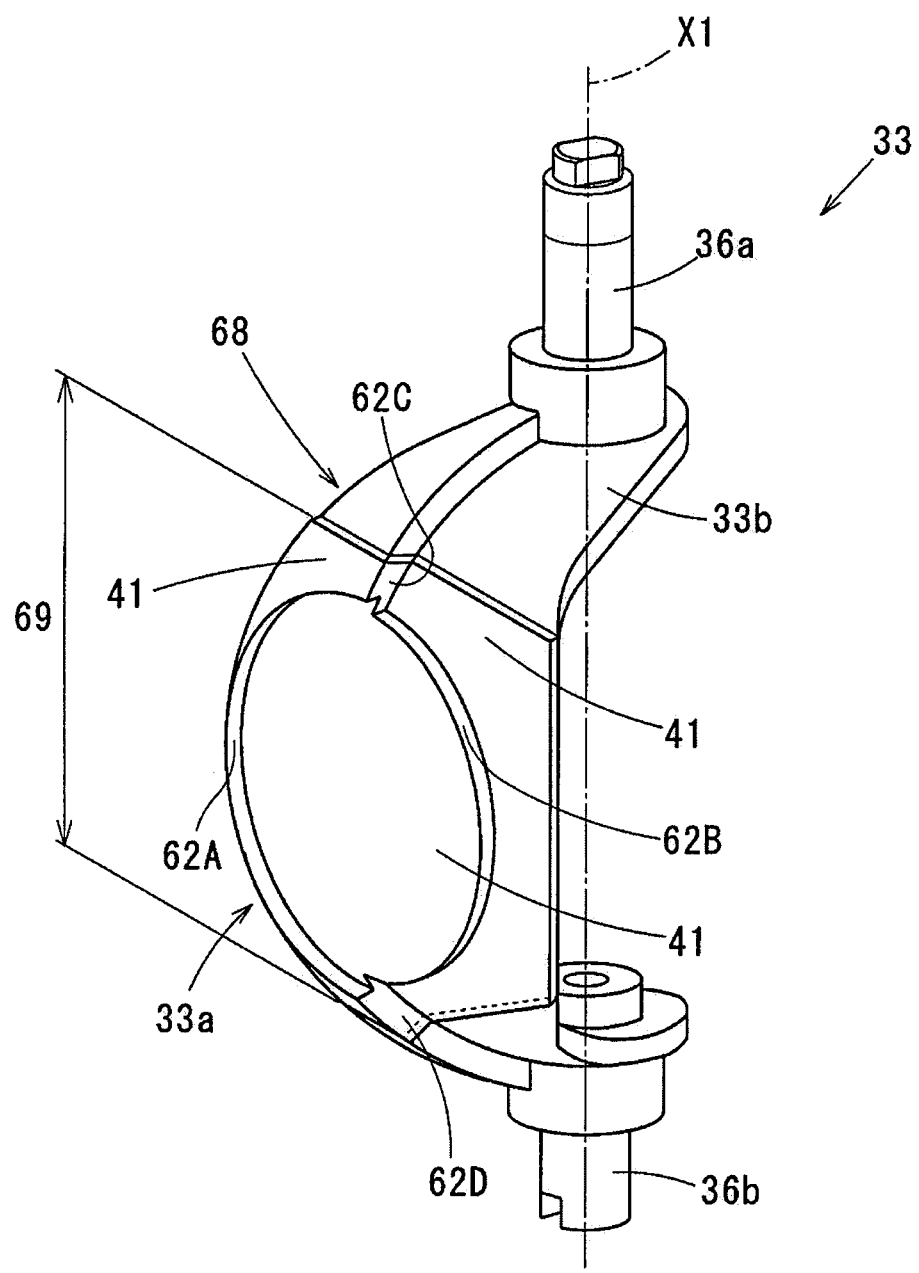
FIG. 21 is a diagram illustrating a perspective view of the valve body in a third embodiment.

As shown in FIG. 21, in the valve device 1 in the third embodiment, a spherical surface is provided on the outer peripheral surface 41 instead of the cylindrical surface. The cylindrical surfaces 62A, 62B and the stepped surfaces 62C, 62D are provided on the spherical surface. The outer surface of the arm 33*b* is a spherical surface which is substantially same to the outer peripheral surface of the valve portion 33, and the valve 33 is as a whole formed as a mirror-image symmetry shape in which a cross section perpendicular to the rotation axis X1 is regarded as a symmetrical surface.

Fourth Embodiment

In the valve device 1 in the fourth embodiment, different parts compared to the valve device 1 in the first embodiment are mainly described.

Figure 22A:
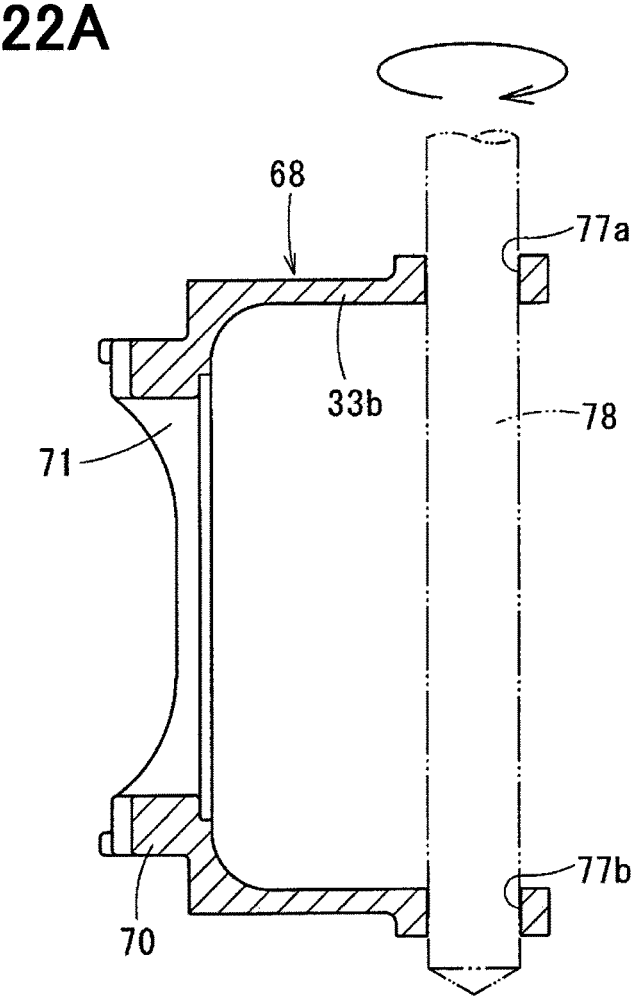
FIG. 22A is a diagram illustrating a state in which a press fitting hole is provided in the core metal by a cutter and FIG. 22B is a diagram illustrating a state in which the shaft is press fitted into the core metal in a fourth embodiment.
Figure 22B:
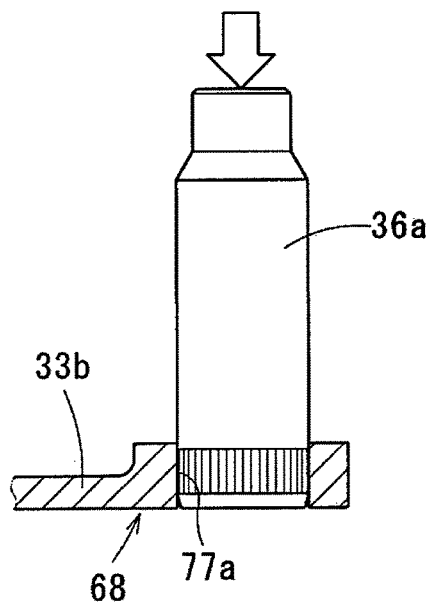

According to the valve device 1 in the fourth embodiment, the core metal 68 is provided separately from the shafts 36*a*, 36*b*, and the shafts 36*a*, 36*b* are fixed to the core metal 68 by press fitting. The core metal 68 has press-fit holes 77*a*, 77*b* in which the shafts 36*a*, 36*b* are press fitted, and the press-fit holes 77*a*, 77*b* are formed by cutting by means of one cutter 78 for providing concentricity, for example, as shown in FIG. 22.

Figure 23A:
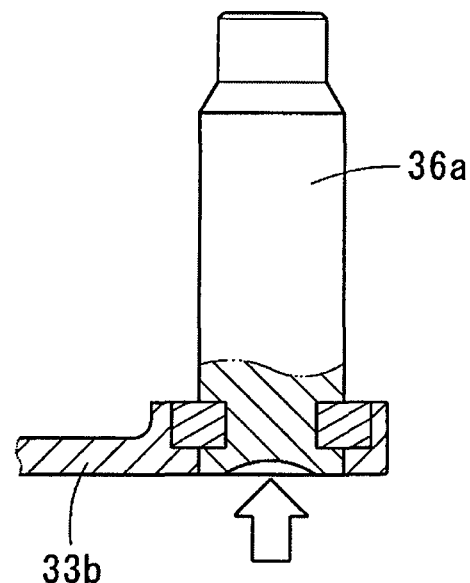
FIG. 23A is a diagram illustrating a state in which the shaft is press-fitted into the core metal and fixed by caulking and FIG. 23B is a diagram illustrating a state in which the shaft is press-fitted into the core metal and fixed by welding in the fourth embodiment.
Figure 23B:
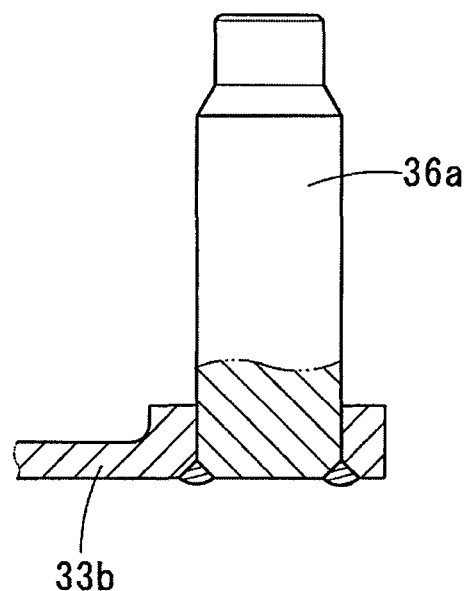

After the shafts 36*a*, 36*b* are press fitted, the shaft 36*a*, 36*b* are firmly fixed to the arm 33*b* by caulking or welding (see, FIG. 23).

Fifth Embodiment

In the valve device 1 in the fifth embodiment, different parts compared to the valve device 1 in the first embodiment are mainly described.

Figure 24:
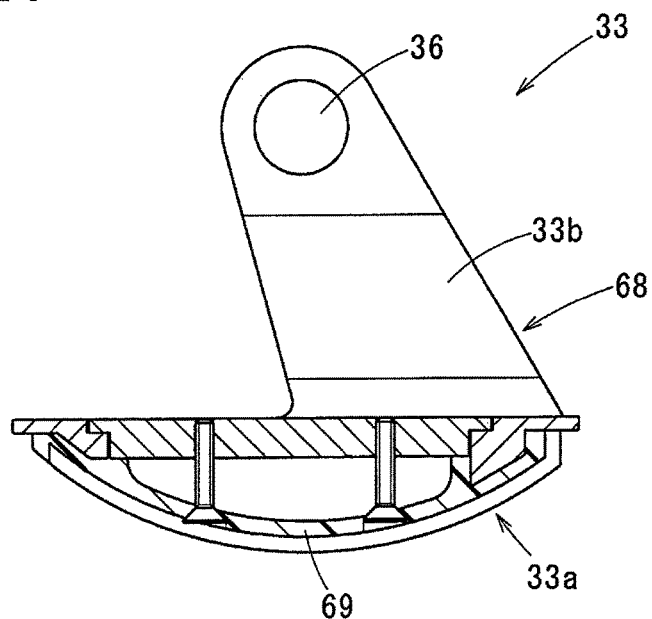
FIG. 24 is a diagram illustrating a state in which the core metal and the resin portion are fastened by a screw in a fifth embodiment.

According to the valve device 1 in the fifth embodiment, the resin portion 69 is provided separately from the core metal 68, and the resin portion 69 is integrated with the core metal 68 by a screw (see, FIG. 24).

Sixth Embodiment

In the valve device 1 in the sixth embodiment, different parts compared to the valve device 1 in the first embodiment are mainly described.

Figure 25A:
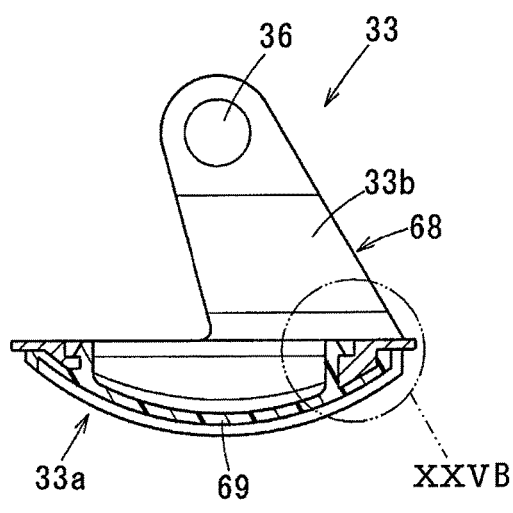
FIG. 25A is a diagram illustrating a state in which the core metal and the resin portion are fastened by a snap fitting and FIG. 25B is a diagram illustrating a partially enlarged view of FIG. 25A in a sixth embodiment
Figure 25B:
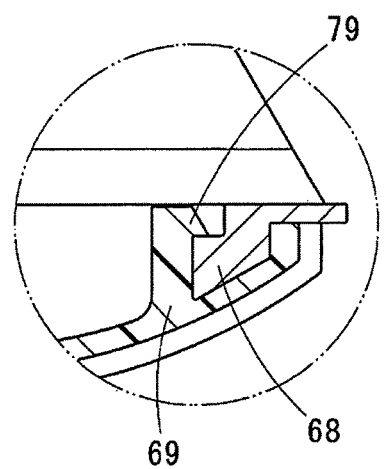

According to the valve device 1 in the fifth embodiment, the resin portion 69 is provided separately from the core metal 68, and the resin portion 69 is integrated with the core metal 68 by a snap fit 79 formed on the resin portion 69 (see, FIG. 25).

Other Embodiment

A variety of forms may be implemented within a reasonable scope.

According to the valve device 1 in the above embodiments, the material of the core metal 68 is an aluminum, however, the material of the core metal 68 may be a stainless steel. The stainless steel is adopted as a material for the core metal 68 to improve corrosion resistance of the valve body 33.

According to the valve device 1 in the above embodiments, the core metal 68 has the hole 71, however the hole 71 may not be provided on the core metal 68.

According to the valve device 1 in the above embodiments, the shafts 36a, 36b have the knurling 75, however, a cut surface, a convex, a recess, or a bending may be provided on the shafts 36a, 36b in place of the knurling 75.

According to the valve device 1 in the above embodiments, the falling-off prevention structure are provided on the whole peripheral of the hole 71, however, the falling-off of the resin portion 69 can be prevented, even if the falling-off prevention structure are not provided on the whole circumference of the hole 71. The falling-off prevention structure may be provided, even if the hole 71 is not provided on the core metal 68.

According to the valve device 1 in the above embodiments, the backlash suppressing structure is provided on the peripheral of the hole 71 and in the cross section γ, however, a position where the backlash suppressing structure is provided is not limited to the above position. If the backlash suppressing structures are provided on predetermined positions, for example, at least at two positions on the peripheral of the hole 71, the backlash of the resin portion 69 can be suppressed. Furthermore, the backlash suppressing structure may be provided, even if the hole 71 is not provided on the core metal 68.

According to the valve device 1 in the above embodiments, the seal lips 64A, 64B made of rubber are provided as the seal part 39B on the stationary side, however, the lips may be provided as the seal part 39A on the rotation side.

The valve device 1 in the above embodiments is provided in a low-pressure loop for recirculating the exhaust gas passed through the turbine 27 to the intake passage 19, however, the valve device 1 may be provided in a high-pressure loop for recirculating the exhaust gas before passing through the turbine 27 to the intake passage 19.

According to the valve device 1 in the above embodiments, the cylindrical body 35 is made of a stainless steel, however, the cylindrical body 35 may be made of other metal or a resin.

Furthermore, according to the valve device 1 in the above embodiments, the seal part 63 is made of the rubber, however, if the seal part 63 can be pushed down by the valve seal surface 62, the material of the seal part 63 is not particularly limited, and a resin may be used as a material for the seal part 63.

What is claimed is:
1. A valve device, comprising:
a shaft configured to be rotationally driven;
a valve body configured to rotate integrally with the shaft and the valve body having at least a part of a cylindrical surface or a spherical surface on an outer peripheral surface which protrudes outwardly in a radial direction; and
a housing having a valve chamber in which the valve body is housed and is rotatably supported, the valve chamber including a valve opening which is opened or closed by the valve body, wherein
the outer peripheral surface of the valve body is in a non-contact with the housing,
the valve body has the valve seal surface for closing the valve opening by abutting on a predetermined part set in the housing when the opening is fully closed, and the valve seal surface is provided on the outer peripheral surface and is directed in a circumferential direction,
the valve body has a resin portion made of a resin, and a core metal made of a metal for supporting the resin portion, and
the shaft is provided on both ends of the core metal in the axial direction of the core metal and the valve seal surface is provided on the resin portion.
2. The valve device according to claim 1, wherein
a seal lip is provided on the predetermined part in the housing.
3. The valve device according to claim 1, wherein
a pinch structure for interposing the core metal with the resin portion is annularly provided on the valve body,
in the pinch structure, an uniform coating area in which a thickness of the resin portion on the both sides for interposing the core metal is equal, is annularly provided, and
the valve seal surface is located outside of a ring formed by the uniform coating area.
4. The valve device according to claim 1, wherein
the core metal is made of a stainless steel.
5. The valve device according to claim 1, wherein
the core metal has a metal surface exposed without being covered with the resin portion.
6. The valve device according to claim 5, wherein
the outer peripheral surface exists on a front side in a peripheral surface of the valve body and the metal surface exists on a rear side in the peripheral surface of the valve body, and
a region is formed by covering the surface of the rear side of the core metal, on the resin surface formed by the resin portion in the surface on the rear side.
7. The valve device according to claim 1, wherein
the core metal has a cylindrical part forming a hole or a recess, and
an inner surface and an outer surface of the cylindrical part are covered with the resin portion at least at two positions around the circumference of the cylindrical part.
8. A method for manufacturing a valve device including a shaft configured to be rotationally driven, a valve body configured to rotate integrally with the shaft and the valve body having at least a part of a cylindrical surface or a spherical surface on an outer peripheral surface which protruding outwardly in the radial direction, and a housing having a valve chamber in which the valve body is housed and rotatably supported, the valve chamber including a valve opening which is opened or closed by the valve body, the method comprising:

providing the valve body in such a manner that the outer peripheral surface is in a non-contact with the housing;

providing the valve body having the valve seal surface for closing the valve opening by abutting on a predetermined part set in the housing when the opening is fully closed, and the valve seal surface being provided on the outer peripheral surface and is directed in the circumferential direction;

providing the valve body having a resin portion made of a resin, and a core metal made of a metal for supporting the resin portion;

fixing the shaft to both ends in the axial direction of the core metal; and providing the valve seal surface with resin.

9. The method for manufacturing the valve device according to claim 8, further comprising:

providing the shafts having a knurling, a cut surface, a convex, a recess, or a bending; and die-casting the core metal, wherein in the die-casting, a part including the knurling, the cut surface, the convex, the recess, or the bending of the shafts is inserted in the mold so as to mold the core metal.

10. The method for manufacturing the valve device according to claim 8, further comprising:

molding the resin portion including the valve seal surface, wherein in the resin molding, sole resin gate is provided.

11. The method for manufacturing the valve device according to claim 10, wherein the sole resin gate is provided at a position where the average value of the distances from the valve seal surface is minimized.

* * * * *